US006876392B1

(12) United States Patent
Uomori et al.

(10) Patent No.: US 6,876,392 B1
(45) Date of Patent: Apr. 5, 2005

(54) RANGEFINDER FOR OBTAINING INFORMATION FROM A THREE-DIMENSIONAL OBJECT

(75) Inventors: Kenya Uomori, Osaka (JP); Takeo Azuma, Nara (JP); Kunio Nobori, Osaka (JP); Atsushi Morimura, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/465,679

(22) Filed: Dec. 17, 1999

(30) Foreign Application Priority Data

Dec. 22, 1998 (JP) .......................................... 10-365688

(51) Int. Cl.[7] .......................... G03B 13/00; H04N 5/222
(52) U.S. Cl. ....................... 348/348; 348/347; 348/364; 348/367; 348/369; 348/370; 396/96
(58) Field of Search .............................. 348/222.1, 335, 348/340, 343, 344, 345, 347, 348, 349, 362–364, 367–369; 250/203.2, 205, 559.07, 559.08, 559.11; 396/89, 96, 106, 108–110

(56) References Cited

U.S. PATENT DOCUMENTS

| | | | | |
|---|---|---|---|---|
| 3,830,567 A | * | 8/1974 | Riegl ......................... | 356/5.05 |
| 4,593,987 A | | 6/1986 | Takahashi et al. | |
| 4,657,382 A | * | 4/1987 | Busujima et al. .......... | 356/5.08 |
| 5,081,530 A | * | 1/1992 | Medina ....................... | 348/46 |
| 5,313,261 A | | 5/1994 | Leatham et al. | |
| 5,315,363 A | * | 5/1994 | Nettleton et al. ........... | 356/5.03 |
| 5,512,997 A | * | 4/1996 | Ogawa ....................... | 356/3.04 |

FOREIGN PATENT DOCUMENTS

| | | | |
|---|---|---|---|
| GB | 2 264 602 | 9/1993 | ........... G01S/17/46 |
| JP | 10-048336 | 2/1998 | |
| WO | WO 97/01111 | * 1/1997 | |

OTHER PUBLICATIONS

Andrew Gruss et al., "A VLSI Smart Sensor for Fast Range Imaging", proceedings of the 1992 IEEE/RSJ International Conference on Intelligent Robots and Systems, Jul. 7, 1992.
Kazuyuki Hattori et al., "Handy Rangefinder for Active Robot Vision", proceedings of the 1995 IEEE International Conference on Robotics and Automation, 1995.
Eupean Search Report, Dated Aug. 14, 2001.
European Search Report, Dated Apr. 24, 2002 Application No. 99125557.1.

* cited by examiner

*Primary Examiner*—Ngoc-Yen Vu
*Assistant Examiner*—Carramah J. Quiett
(74) *Attorney, Agent, or Firm*—Nixon Peabody LLP

(57) ABSTRACT

A rangefinder according to the present invention includes light source section, camera section, distance-measuring sensor, exposure controller and shutter. The light source section projects light onto an object for 3D imaging purposes. The camera section receives the light that was emitted from the light source section and then reflected from the object. The distance-measuring sensor estimates an approximate distance to the object. Based on the approximate distance, the exposure controller controls the optical output power of the light source section and/or the open/closed states of the shutter. The rangefinder can control the intensity of the projected light even if the object is on the move. As a result, the rangefinder can obtain highly precise information about the 3D location of the object.

10 Claims, 22 Drawing Sheets

Fig. 3(a)
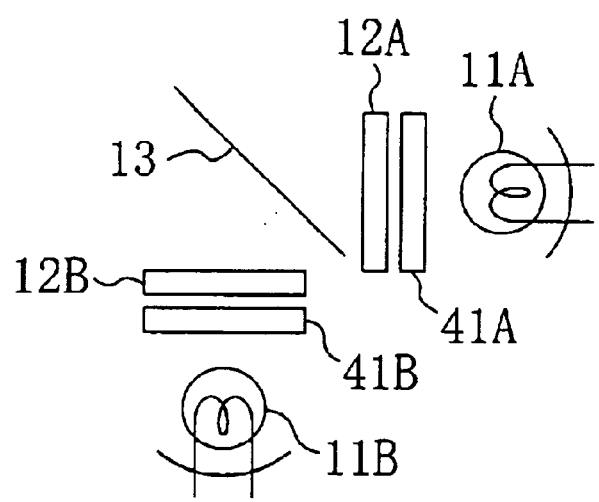
Fig. 3(b) <u>41A, 41B</u>
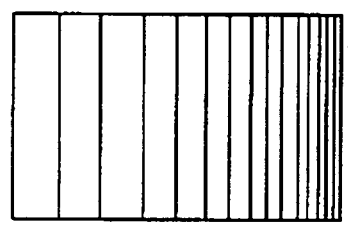
transmittance    high ⟶ low

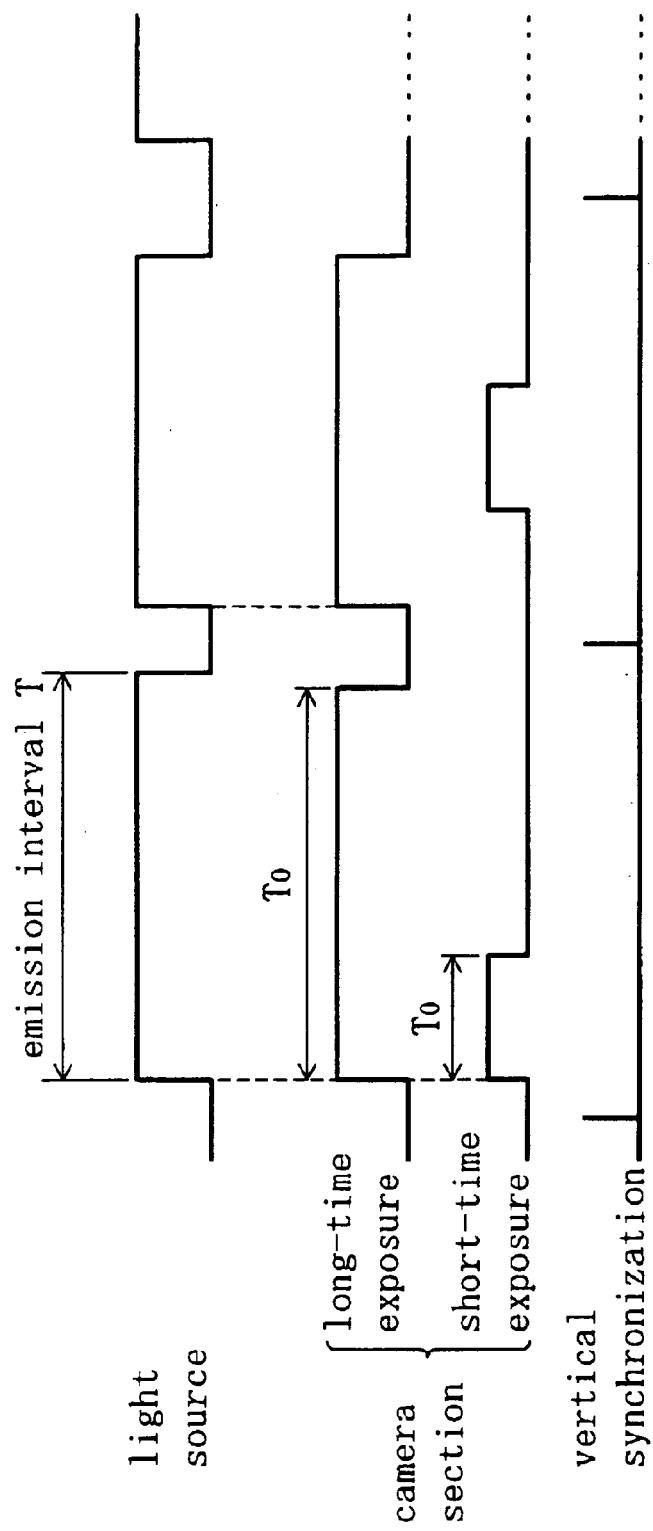

T1···range image capturing
T2···color image capturing

T1···distinguishing
T2···separating

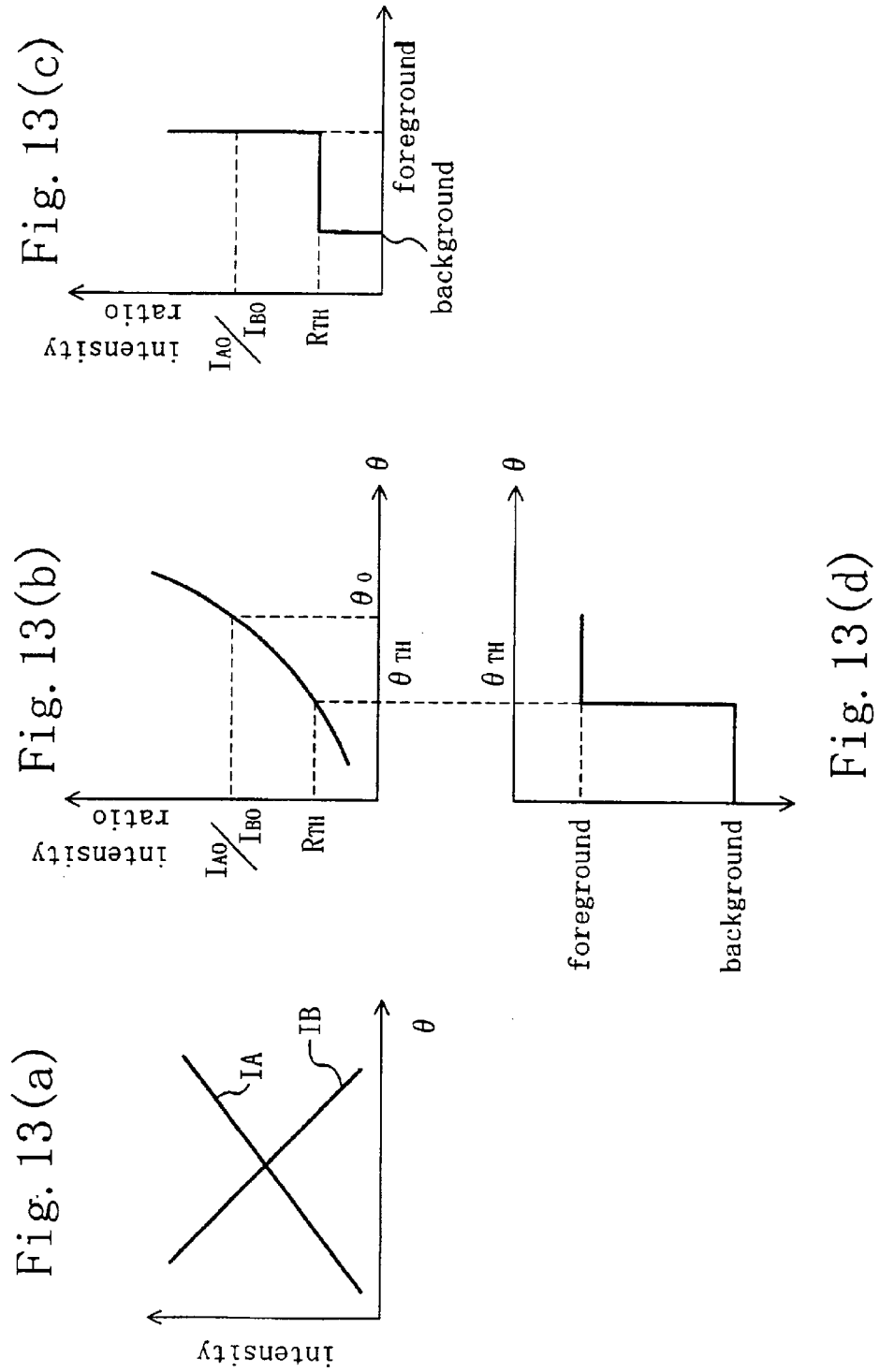

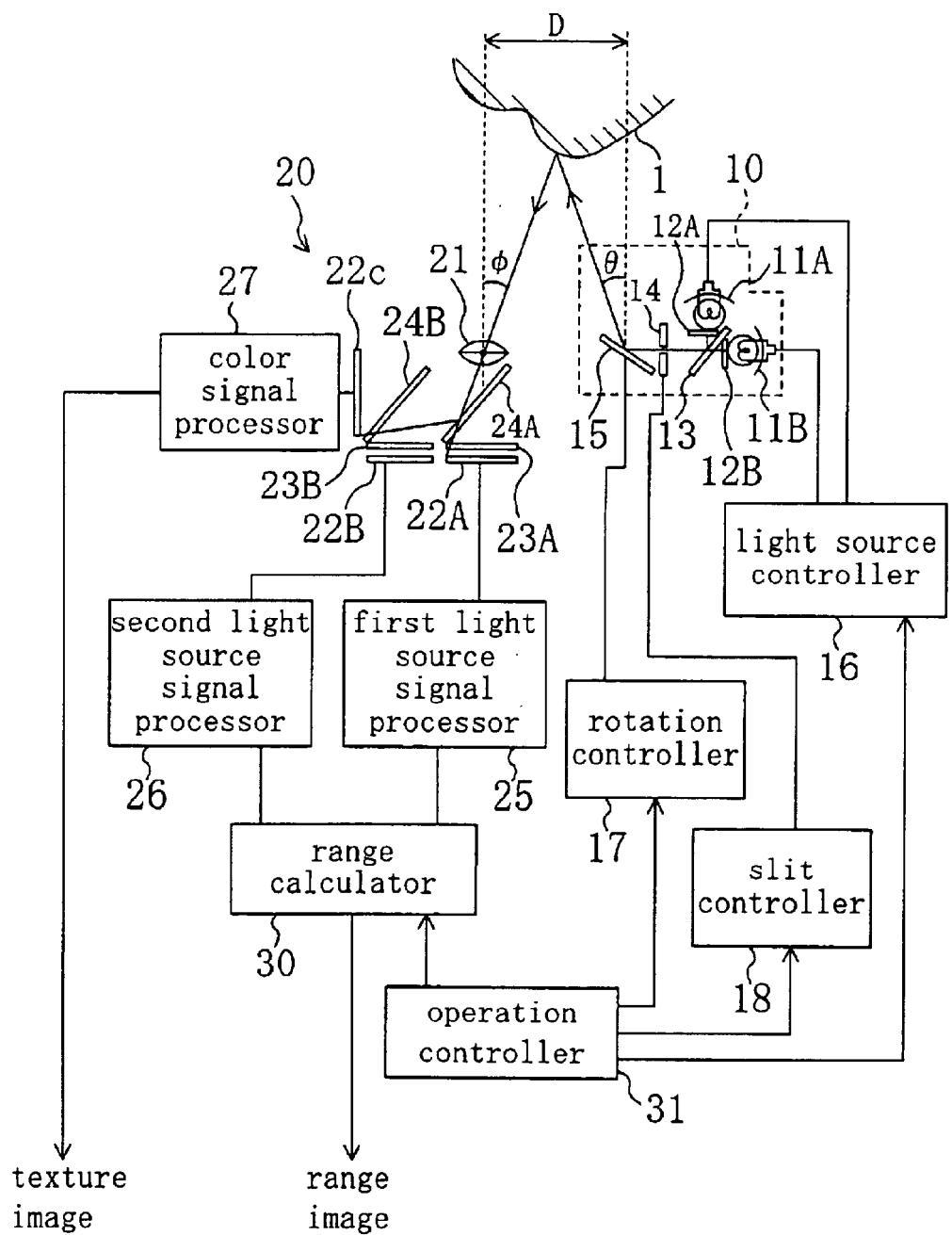

RANGEFINDER FOR OBTAINING INFORMATION FROM A THREE-DIMENSIONAL OBJECT

BACKGROUND OF THE INVENTION

The present invention relates to a rangefinder for obtaining information about the three-dimensional (3D) location of an object and also relates to an imager.

FIG. 22 illustrates an exemplary configuration for a prior art rangefinder. As shown in FIG. 22, a light source section 10 includes first and second light sources 11A and 11B. Filters 12A and 12B are disposed in front of the light-emitting ends of the light sources 11A and 11B, respectively. The light beams that have been emitted from the first and second light sources 11A and 11B are combined into a single beam at a half mirror 13. Then, the combined beam is projected onto an object 1 after having passed through a slit 14 and a rotating mirror 15. The output wavelengths of the light sources 11A and 11B are defined within the infrared range of the spectrum.

FIGS. 23(a) and 23(b) illustrate exemplary characteristics of the filters 12A and 12B. As shown in FIG. 23(a), the filters 12A and 12B may selectively transmit light beams with mutually different wavelengths. Alternatively, these filters 12A and 12B may separate the light in accordance with the wavelength.

A camera section 20 includes first and second imagers 22A and 22B for measuring the distance of the object 1. In front of the light-receiving ends of these imagers 22A and 22B, disposed are filters 23A and 23B, which exhibit the same characteristics as the filters 12A and 12B in the light source section 10, respectively. By using these filters 23A and 23B, the imagers 22A and 22B can separately receive respective parts of the light beams that have been emitted from the first and second light sources 11A and 11B and then reflected from the object 1. The camera section 20 further includes a third imager 22C for receiving light in the visible range of the spectrum. The output signal of the imager 22C is processed by a color signal processor 27, thereby obtaining a texture image (or color image) of the object 1.

FIG. 24(a) illustrates a relationship between the intensity of the projected light beams and the projection angle θ of the combined light beam. As shown in FIG. 24(a), a light source controller 16 controls the intensities IA and IB of the light beams emitted from the light sources 11A and 11B, respectively, as the projection angle θ of the combined light beam is changed by the rotating mirror 15. Consequently, the intensity ratio IA/IB changes as shown in FIG. 24(b). As can be seen from FIG. 24(b), there is one-to-one correspondence between the intensity ratio IA/IB and the projection angle θ. That is to say, if the intensity ratio IA/IB is known, then the associated projection angle θ is identifiable immediately. In addition, once the projection angle θ has been identified, the distance Z to the object 1 can be obtained as shown in FIG. 24(c).

Hereinafter, it will be described how the prior art rangefinder shown in FIG. 22 operates.

First, in the light source section 10, the first and second light sources 11A and 11B output respective light beams. These outgoing light beams pass through the filters 12A and 12B, respectively, and then combined into a single beam at the half mirror 13. Next, the combined light beam is transformed into vertically elongated slit-like light beam at the slit 14. Then, the slit-like light beam is reflected from the rotating mirror 15, which is controlled by a rotation controller 17, so as to be projected onto the object 1.

The reflected part of the light beam incident on the object 1 enters the camera section 20. The respective imagers 22A, 22B and 22C receive the reflected light beam via a lens 21 and half mirrors 24A and 24B. In this case, the combined light beam is separated by the filters 23A and 23B into respective beams, which are subsequently incident on the first and second imagers 22A and 22B. Each of these beams separated has a single corresponding wavelength.

A first light source signal processor 25 receives the output of the first imager 22A and outputs a video signal corresponding to the reflected part of the light beam that was initially emitted from the first light source 11A. In the same way, a second light source signal processor 26 receives the output of the second imager 22B and outputs a video signal corresponding to the reflected part of the light beam that originated from the second light source 11B. Responsive to the video signals provided from the first and second light source signal processors 25 and 26, a range calculator 30 calculates the intensity ratio on a pixel-by-pixel basis, and then estimates the projection angle θ for each pixel based on the correspondence shown in FIG. 24(b).

In this case, a viewing angle ø is defined for each pixel location at the imager as an angle formed between a line of sight passing through the center of the lens 21 and the optical axis of the lens 21 as shown in FIG. 22. There is also one-to-one correspondence between each pixel location and the associated viewing angle ø. Thus, if a particular pixel location is given, then the associated viewing angle ø is known automatically. In addition, the distance D between the center of the lens 21 and the center of rotation of the rotating mirror 15 is also already known as shown in FIG. 22.

Thus, the range calculator 30 can obtain, by the triangulation technique, the distance Z between a point on the object 1, which corresponds to each pixel location, and the camera section 20 on a pixel-by-pixel basis by substituting the projection angle θ, viewing angle ø and distance D into the following Equation (1):

$$Z = (\tan\theta \cdot \tan\emptyset / \tan\theta - \tan\emptyset) \cdot D \quad (1)$$

In this manner, information about the 3D location of the object 1 can be obtained.

Also, not just the information about the 3D location of the object 1, but the texture image (or color image) of the object 1 are obtainable from the color signal processor 27 based on the output of the third imager 22C.

The prior art rangefinder, however, has the following drawbacks.

Firstly, in the conventional rangefinder, the optical output power of the light source section 10 is supposed to be adjusted by the user. In fact, the power has been adjusted appropriately through the user's experience or by his or her trial and error. In other words, if a beginner should handle such a rangefinder, it is usually difficult for him or her to control the optical output power effectively. As a result, the user cannot always obtain precise range information. Secondly, if the object is on the move, then the optical output power should be re-adjusted for every movement of the object, thus taking too much time and trouble. Thirdly, supposing the output power is set too high while the object is located very close to the rangefinder, some harm might be done on the object.

Moreover, the known rangefinder has additional problems. FIG. 25 illustrates the signal levels of a video signal during a 3D imaging process. In FIG. 25, L represents the signal level of the overall video signal, LA represents the signal level of reflected part of the light and LB represents the signal level of an image component of an object (i.e., background light). To increase the precision of the 3D location information, the optical output power of the light source section 10 should be set at such a value as increasing the signal-to-noise ratio of the signal level LA of the reflected light component. However, since the dynamic range of the camera section 20 is predefined, the signal level LA of the reflected light component cannot be increased above a certain maximum acceptable level. On the other hand, the signal level LB of the image component of the object should be no lower than a certain minimum acceptable level to obtain a normal two-dimensional (2D) image. Accordingly, the signal-to-noise ratio of the object cannot be increased sufficiently, thus interfering with the precision improvement of the 3D location information.

Furthermore, in the field of computer vision, for example, a technique of dividing the image of an object into foreground and background parts based on the range information about the object and then separating only the foreground part is known. However, a system like a videophone is strongly required to separate a human face image (i.e., the foreground part of the image) from the background accurately, but it is not always necessary for such a system to obtain the range information itself about the object. Accordingly, a technique of dividing the image of an object into foreground and background parts without using the range information thereof should preferably be developed.

SUMMARY OF THE INVENTION

An objective of the present invention is providing a rangefinder that can always obtain highly precise information about the 3D location of an object without doing any harm on the object.

Another objective of the present invention is providing an imager that can divide the image of an object into foreground and background parts without using the range information about the object.

Specifically, a rangefinder according to the present invention is adapted to obtain information about the 3D location of an object by projecting light onto the object and receiving part of the light that has been reflected from the object. The rangefinder includes: a light source for projecting the light on the object; a camera for receiving the part of the projected light that has been reflected from the object; and a controller for controlling optical output power of the light source and/or exposure conditions of the camera based on range information about the object.

According to the present invention, the optical output power of the light source and/or the exposure conditions of the camera are controlled based on the range information about the object. That is to say, even if the object has moved, the intensity of the projected light and/or the signal level of the received light is/are controlled correspondingly. As a result, highly precise 3D location information can always be obtained. Also, the inventive rangefinder is operative such that the projected light does no harm on even an object that has come too close to the rangefinder.

In one embodiment of the present invention, the rangefinder may further include a distance-measuring sensor for measuring the distance to the object, and the controller may use the output of the distance-measuring sensor as an item of the range information about the object.

In an alternate embodiment, the rangefinder may further include a range calculator for obtaining a range image based a video signal output from the camera, and the controller may use the range image obtained by the range calculator as an item of the range information about the object.

In another embodiment of the present invention, if the controller has determined based on the range information that the distance to the object is equal to or greater than a first threshold value, then the controller preferably increases the optical output power of the light source. Alternatively, if the controller has determined based on the range information that the distance is equal to or smaller than a second threshold value, then the controller preferably decreases the optical output power of the light source.

In still another embodiment, the exposure conditions of the camera are preferably defined based on at least one of a diaphragm stop, a sensitivity of an imager and a shutter speed.

In yet another embodiment, the rangefinder may further include a shutter, which can open and close freely and blocks the light that has been projected from the light source when closed, and the controller preferably controls the open and closed states of the shutter selectively.

Another rangefinder according to the present invention is also adapted to obtain information about the 3D location of an object by projecting light onto the object and receiving part of the light that has been reflected from the object. The rangefinder includes: a light source for projecting the light on the object; a camera for receiving the part of the projected light that has been reflected from the object; and a controller for controlling optical output power of the light source and/or exposure conditions of the camera based on information about the level of a video signal output from the camera.

According to the present invention, the optical output power of the light source and/or the exposure conditions of the camera are controlled based on information about the level of a video signal output from the camera. That is to say, even if the object has moved, the intensity of the projected light and/or the signal level of the received light is/are controlled correspondingly. As a result, highly precise 3D location information can always be obtained.

In one embodiment of the present invention, if the controller has determined based on the level information that the distance to the object is equal to or greater than a first threshold value, the controller preferably increases the optical output power of the light source. Alternatively, if the controller has determined based on the level information that the distance is equal to or smaller than a second threshold value, the controller preferably decreases the optical output power of the light source.

In another embodiment of the present invention, the exposure conditions of the camera are preferably defined based on at least one of a diaphragm stop, a sensitivity of an imager and a shutter speed.

In still another embodiment, the rangefinder may further include a shutter, which can open and close freely and blocks the light that has been projected from the light source when closed, and the controller preferably controls the open and closed states of the shutter selectively.

Still another rangefinder according to the present invention is also adapted to obtain information about the 3D location of an object by projecting light onto the object and receiving part of the light that has been reflected from the object. The rangefinder includes: a light source for projecting the light on the object; a camera for receiving the part of the projected light that has been reflected from the object, the camera being able to capture a 2D image; and a controller for setting a signal level of an image component of the object lower in capturing a three-dimensional image than in capturing the 2D image so as to sufficiently increase a signal level of the reflected light when the light source projects the light on the object.

According to the present invention, the image component of the object has its signal level lowered in capturing a 3D image compared to capturing a 2D image. As a result, the signal-to-noise ratio of the signal representing that part of the projected light reflected from the object increases and yet the quality of the 2D image does not deteriorate. Thus, the precision of the 3D location information improves.

In one embodiment of the present invention, the camera may include a filter for adjusting an intensity per unit area of the light incident on the camera. And the controller may set transmittance of the filter relatively low in capturing the 3D image and relatively high in capturing the 2D image.

In this particular embodiment, the filter preferably includes a liquid crystal device. The transmittance of the filter is preferably controllable based on a voltage applied to the liquid crystal device.

In an alternate embodiment, the controller may control the exposure conditions of the camera.

In this particular embodiment, the exposure conditions of the camera are preferably defined based on at least one of a diaphragm stop, a sensitivity of an imager and a shutter speed.

An imager according to the present invention includes: a light source for projecting light onto an object, the optical properties of the projected light changing depending on a direction in which the light has been projected; a camera for capturing a 2D image of the object by receiving part of the projected light that has been reflected from the object; and a foreground/background distinguisher for dividing the 2D image into foreground and background parts based on optical properties of the light that has been reflected from the object.

According to the present invention, a 2D image is divided into foreground and background parts based on the optical properties of the light that was emitted from a light source toward an object and then reflected from the object. Thus, the image is separable into the foreground and background parts without using the range information.

In one embodiment of the present invention, the imager may further include a separator for cutting out the foreground or background part from the 2D image based on the result of division performed by the identifier.

In another embodiment of the present invention, the light source may project first and second light beams. The intensity of each of the first and second beams is variable depending on a direction in which the beam has been projected. The intensity of the first beam changes in a different pattern than that of the second beam. And the foreground/background distinguisher may distinguish the foreground and background parts from each other based on an intensity ratio of reflected part of the first beam to that of the second beam.

In an alternate embodiment, the light source may project light with an intensity variable depending on a direction in which the light has been projected. And the foreground/background distinguisher may distinguish the foreground and background parts from each other based on an intensity of reflected part of the projected light.

In still another embodiment, the imager may further include a threshold determiner for determining a threshold value on an object-by-object basis as a reference for distinguishing the foreground and background parts from each other.

In this particular embodiment, the threshold determiner preferably determines the threshold value based on the distribution of optical properties of the light that has been reflected from the object and incident on respective pixels in the camera.

In an alternate embodiment, the threshold determiner may determine the threshold value based on a surface reflectance of the object.

In this particular embodiment, the imager preferably further includes a distance-measuring sensor for measuring the distance to the object, and the threshold determiner preferably estimates the surface reflectance of the object based on the distance measured by the distance-measuring sensor.

BRIEF DESCRIPTION OF THE DRAWINGS

FIG. 2(a) is a graph showing a relationship between the distance to an object and the optical output power of a light source section; and FIG. 2(b) is a graph showing a relationship between the distance to the object and the open/closed states of a shutter.

FIGS. 3(a) and 3(b) illustrate another exemplary arrangement of the light source section.

FIG. 4 illustrates an embodiment where the exposure conditions of a camera section are controlled based on a shutter speed.

FIG. 8(a) illustrates the level of a video signal in a first interval T1 for 3D imaging; and FIG. 8(b) illustrates the level of the video signal in a second interval T2 for 2D imaging.

FIGS 13(a) through 13(d) illustrate how to distinguish foreground and background parts from each other based on an intensity ratio.

FIG. 22 is a block diagram illustrating a configuration for a prior art rangefinder.

DESCRIPTION OF THE PREFERRED EMBODIMENTS

Hereinafter, preferred embodiments of the present invention will be described with reference to the accompanying drawings.

Embodiment 1

Figure 1:
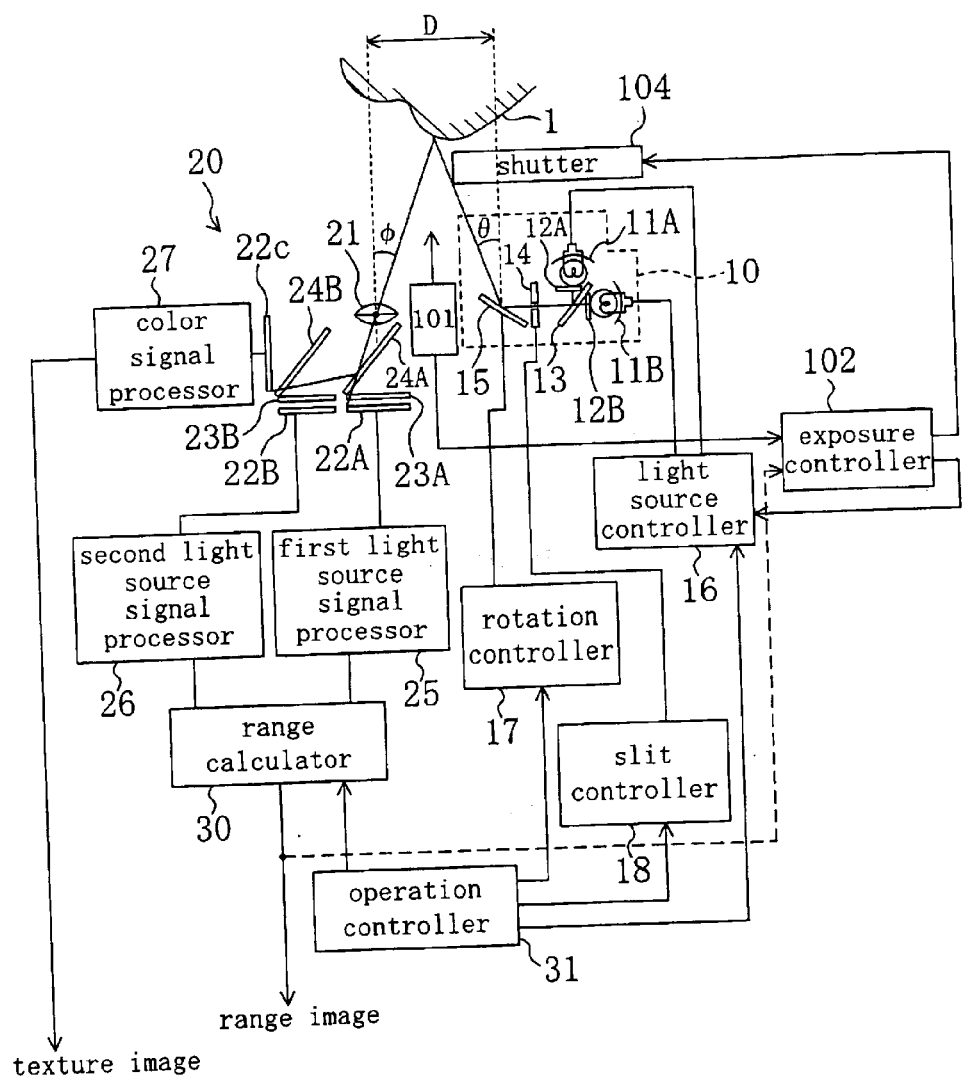
FIG. 1 is a block diagram illustrating a configuration for a rangefinder according to a first embodiment of the present invention.

FIG. 1 illustrates a configuration for a rangefinder according to a first exemplary embodiment of the present invention. In FIG. 1, the same members as those included in the prior art rangefinder shown in FIG. 22 are identified by the same reference numerals and the detailed description thereof will be omitted herein.

As shown in FIG. 1, the rangefinder includes a distance-measuring sensor 101 for estimating an approximate averaged distance from the rangefinder to an object 1. The distance-measuring sensor 101 is implementable as a sensor of the type detecting ultrasonic waves reflected from the object 1. The rangefinder also includes an exposure controller 102, which is equivalent to the controller as defined in the appended claims. Based on range information provided from the distance-measuring sensor 101, the exposure controller 102 controls the operations of a light source controller 16 and a shutter 104. As in the known rangefinder, the light source controller 16 controls the optical output power (or the emission intensity per unit area) of a light source section 10. The shutter 104 is disposed in a freely opening and closing position in front of the light projected from the light source section 10. When closed following an instruction issued from the exposure controller 102, the shutter 104 cuts off the optical path of the light projected from the light source section 10.

Figure 2A:
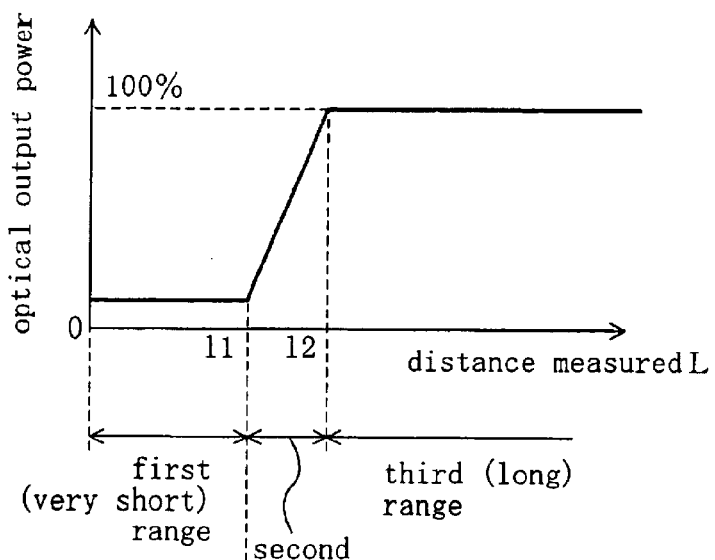
FIGS. 2(a) and 2(b) illustrate the operating principle of the rangefinder shown in FIG. 1.
Figure 2B:
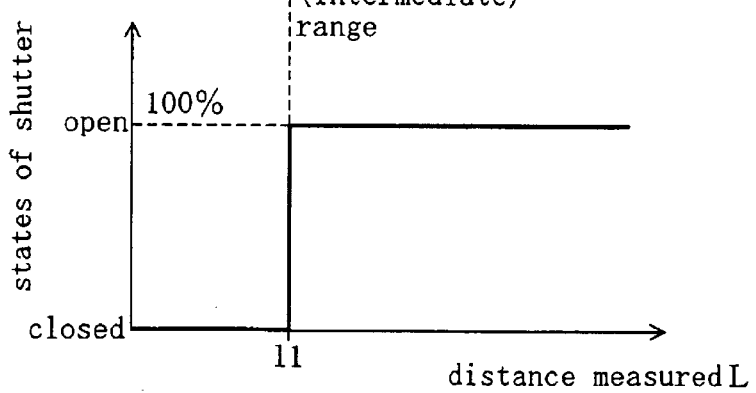

Next, it will be described with reference to FIGS. 2(a) and 2(b) how the rangefinder shown in FIG. 1 operates. FIG. 2(a) shows a relationship between the distance L to the object 1 and the optical output power of the light source section 10, while FIG. 2(b) shows a relationship between the distance L to the object 1 and the open/closed states of the shutter 104.

First, the distance-measuring sensor 101 measures the distance L to the object 1 and provides the result L to the exposure controller 102. At this point in time, no light has not been projected from the light source section 10 yet. In response to the given distance L, the exposure controller 102 finds out the location of the object 1 based on predetermined first and second reference values 11 and 12, i.e., in which of the first (very short), second (intermediate) and third (long) ranges the object 1 is now located. The location of the object 1 is determined as follows:

1) if $0 \leq L \leq l1$, then the object is located in the first range;
2) if $l1 < L < l2$, then the object is located in the second range; and
3) if $l2 < L$, then the object is located in the third range.

Depending on the location of the object 1, the exposure controller 102 operates in the following manner:

1) If the object 1 is located in the first range, then the exposure controller 102 avoids the projection of light onto the object 1 because the object 1 is located too close to the rangefinder. Accordingly, the exposure controller 102 sets the optical output power of the light source section 10 relatively low as shown in FIG. 2(a), and totally closes the shutter 104 as shown in FIG. 2(b), thereby preventing the light from being projected onto the object 1. It is noted, however, that the optical output power of the light source section 10 should not be turned OFF completely. This is because the optical output power of the light source section 10 can rise faster on demand compared to the situation where the power is turned OFF completely.

It is for the purpose of protecting the object 1 from the optical power radiated that the projection of the light onto the object 1 is avoided. Particularly when laser radiation is emitted from the light source section 10, the energy applied to that too closely located object 1 will be of an excessively high density, and therefore some harm might be done on the object 1.

Since no light is projected on the object 1 in this case, no 3D location information is obtained. To collect the 3D location information, the object 1 should be moved to an appropriate location, which is moderately distant from the rangefinder.

2) If the object 1 is located in the second range, then the exposure controller 102 opens the shutter 104 as shown in FIG. 2(b), and controls the optical output power of the light source section 10 as shown in FIG. 2(a) such that the level of a video signal output from the camera section 20 falls within an appropriate range. In this manner, it is possible to prevent the intensity of the light projected per unit area from reaching too high or too low a level, thus always ensuring a high signal-to-noise ratio for the reflected part of the light projected. As a result, highly precise 3D location information can be obtained.

3) If the object 1 is located in the third range, then the light source section 10 should project as intense light as possible because the object 1 is located too distant from the rangefinder. Thus, the exposure controller 102 opens the shutter 104 as shown in FIG. 2(b), and sets the optical output power of the light source section 10 relatively high, or preferably maximizes the power, as shown in FIG. 2(a).

If the object 1 is located in either the second or third range, then the 3D location information is obtained by the known technique after the operations specified in 2) and 3) have been performed.

In the illustrated embodiment, the optical output power of the light source section 10 is controlled with the distance to the object 1 divided into three ranges. It should be noted, however, that the optical output power is controllable by any other technique. For example, the first and second reference values 11 and 12 may be combined together, i.e., the optical output power is also controllable by two steps. Alternatively, the optical output power is controllable more finely by dividing the distance into a greater number of ranges.

The exposure conditions of the camera section 20 may be controlled instead of, or in addition to, the control over the optical output power of the light source section 10. For that purpose, the diaphragm stop, sensitivity of the imager or shutter speed may be controlled, for example. Specifically, when the object 1 is located in the second range, the optical output power of the light source section 10 may be maximized (i.e., 100% power may be output), and the exposure conditions of the camera section 20 are adjustable such that the level of the video signal output from the camera section 20 falls within a proper range.

Optionally, just the optical output power of the light source section 10 and/or the exposure conditions of the camera section 20 may be controlled with the shutter 104 eliminated from the rangefinder.

FIG. 3(a) illustrates another exemplary configuration for the light source section 10. As shown in FIG. 3(a), variable transmittance filters 41A and 41B are disposed in front of the light sources 11A and 11B, respectively. That is to say, this light source section 10 is so constructed as to project patterned light beams, not to sweep the object 1 with the single combined beam. As shown in FIG. 3(b), the transmittance of each of the variable transmittance filters 41A and 41B differs depending on the position through which the light is transmitted. When monochromatic light sources such as laser diodes are used as the light sources 11A and 11B, the filters 12A and 12B may be omitted.

FIG. 4 illustrates an embodiment where the exposure conditions of the camera section 20 are controlled based on the shutter speed thereof. To control the exposure conditions in accordance with the shutter speed, the light source section 10 is supposed to project patterned light beams as shown in FIG. 3, not the sweeping type. In this case, the emission interval T of the light source section 10 should preferably be constant as shown in portion (a) of FIG. 4. Also, the exposure interval T0 of the camera section 20 per vertical interval should preferably be changed by controlling the shutter speed as shown in portion (b) of FIG. 4. Conversely, the exposure interval T0 of the camera section 20 may be constant, and the emission interval T of the light source section 10 may be changed. In such a case, $T0 \geq T$ is met.

In the foregoing embodiment, the distance-measuring sensor 101 is provided as exemplary means for obtaining range information about the object. It should be noted, however, that such means is an optional one, not indispensable. If the sensor 101 is omitted, then the optical output power of the light source section 10 and/or the exposure conditions of the camera section 20 are controllable by using a "range image" that has been obtained by the range calculator 30 as an item of the range information about the object 1. Nevertheless, since the range information is needed first of all to identify the location of the object 1, the light source section 10 should initially project the light onto the object 1 in such a case. However, the optical output power of the light source section 10 should preferably be minimized at first because the location of the object 1 is unknown at this stage.

In this specification, the "range image" means an image in which the distances from the camera or the depths in a three-dimensional coordinate system are specified for respective pixels. The distance from the camera corresponds to r in a spherical coordinate system (r, θ, ø) while the depth corresponds to z in a rectangular coordinate system (x, y, z).

Also, the range image obtained by the range calculator 30 might be seriously erroneous if the level of the video signal output from the camera section 20 is inappropriate. For instance, supposing the object 1 is located too far, the signal-to-noise ratio of the range image is appreciably low because just a weak signal is obtained for the light reflected from such a far object 1. If the power and/or exposure conditions are controlled using the range image with such a low signal-to-noise ratio as an item of the range information about the object, then the system might lose it stability. In other words, by providing additional sensing means such as the distance-measuring sensor 101 separately from the means for obtaining the range image and using the distance measured by that means as range information about the object as is done in the foregoing embodiment, more stabilized control is realized.

The optical output power of the light source section 10 and/or the exposure conditions of the camera section 20 are controllable based on the information about the level of the video signal output from the camera section 20, instead of the range information about the object 1.

In the foregoing embodiment, the present invention has been described as being applied to a rangefinder for capturing a 3D image based on an intensity ratio. Alternatively, the rangefinder is operative based on any other optical characteristic such as the wavelength of the light. In such a case, the camera section 20 shown in FIG. 1 should be replaced with a camera that can measure the wavelength of reflected light beam. Also, not just the correspondence between the optical characteristic and projection angle of the light emitted, but also a time taken for the projected light to reach each photodetector since the start of sweeping are applicable. See, for example, A. Gruss, S. Tada and T. Kanade, "A VLSI Smart Sensor for Fast Range Imaging", in Proceedings of the 1992 IEEE/RSJ International Conference on Intelligent Robots and Systems, pp. 349–358, July 1992.

Embodiment 2

Figure 5:
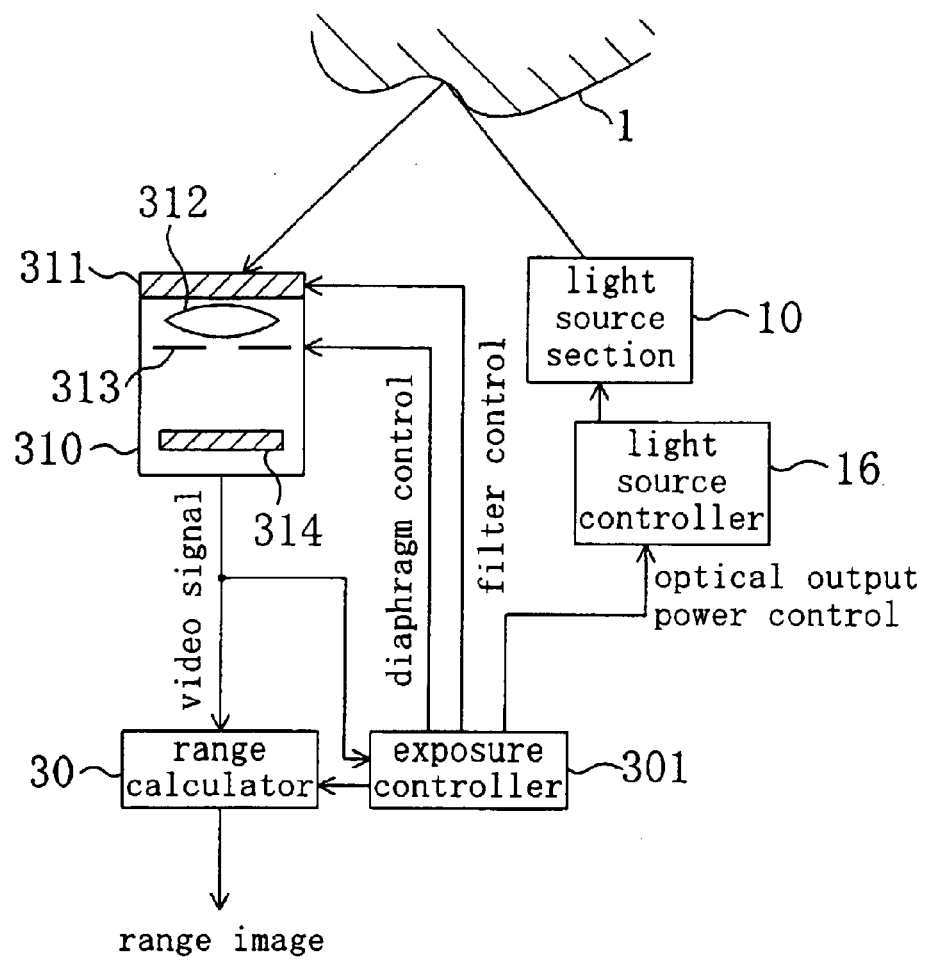
FIG. 5 is a block diagram illustrating a configuration for a rangefinder according to a second embodiment of the present invention.

FIG. 5 illustrates a configuration for a rangefinder according to a second embodiment of the present invention. In FIG. 5, the same members as those included in the prior art rangefinder shown in FIG. 22 are identified by the same reference numerals and the detailed description thereof will be omitted herein. In the rangefinder shown in FIG. 5, light is also projected from a light source section 10 and part of the light that has been reflected from an object 1 is also received at a camera section 310, thereby obtaining information about the 3D location of the object 1. According to the second embodiment, the camera section 310 can capture a color image (i.e., a 2D image), too. The 3D location information is obtained by the known technique.

The camera section 310 includes a lens 312, a diaphragm 313, an imager (CCD) 314 and a neutral density (ND) filter 311, which is disposed in front of the lens 312. The ND filter 311 includes a liquid crystal device. The transmittance of the ND filter 311 is controllable based on a voltage applied to the liquid crystal device. An exposure controller 301 is equivalent to the controller as defined in the appended claims. The exposure controller 301 controls the diaphragm 313 or ND filter 311 of the camera section 310 or the optical output power (emission intensity) of the light source section 10 responsive to a video signal output from the camera section 310.

Figure 6:
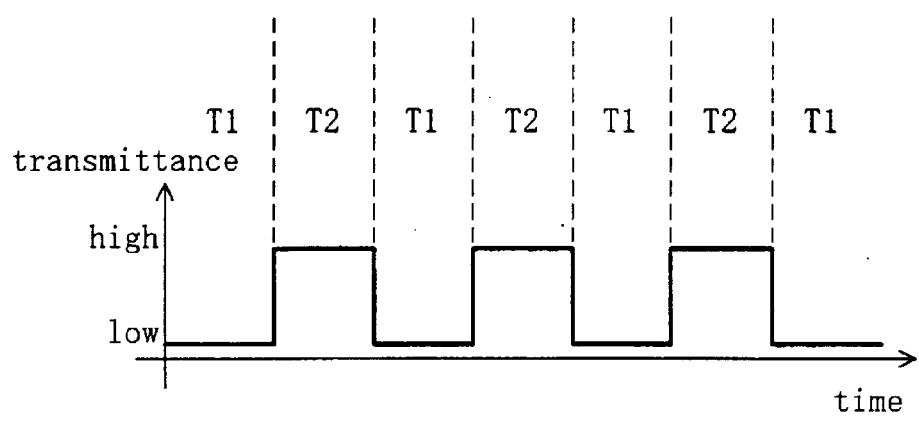
FIG. 6 illustrates a relationship between the operation of the rangefinder shown in FIG. 5 and the transmittance of an ND filter.

FIG. 6 illustrates a relationship between the operation of the rangefinder shown in FIG. 5 and the transmittance of the ND filter 311. In the illustrated embodiment, a first interval T1, during which a 3D image (i.e., a range image) is captured, and a second interval T2, during which a color image is captured, alternate one after the other. The transmittance of the ND filter 311 is set relatively low in the first interval T1 but relatively high in the second interval T2 by the exposure controller 301. In the first interval T1, the light source section 10 is controlled by the exposure controller 301 and light source section controller 16 as in conventional 3D imaging. In the second interval T2 on the other hand, the light source section 10 is turned OFF.

Figure 7:
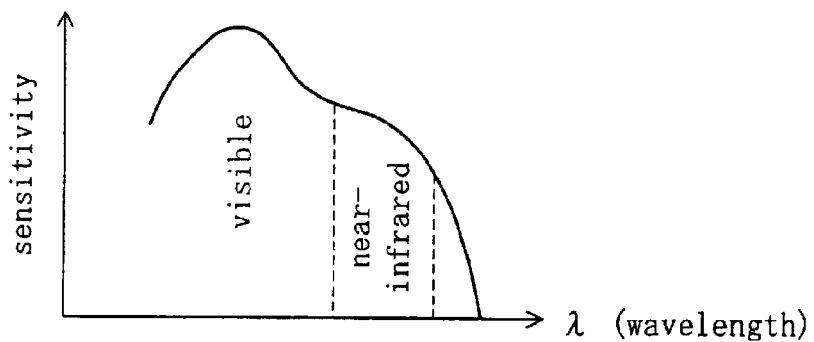
FIG. 7 is a graph illustrating a relationship between the sensitivity of a CCD included in the camera section of the rangefinder shown in FIG. 5 and the wavelength of the incident light.

FIG. 7 illustrates a relationship between the sensitivity of the imager 314 included in the camera section 310 and the wavelength of the incident light. The light projected from the light source section 10 has its wavelength defined in the near infrared range. The sensitivity of the imager 314 in the camera section 310 is adjusted as shown in FIG. 7. As can be seen from FIG. 7, part of the incident light in the visible range is used for capturing a color image, while another part of the incident light in the near-infrared range is used for 3D imaging, i.e., capturing a range image.

Figure 8A:
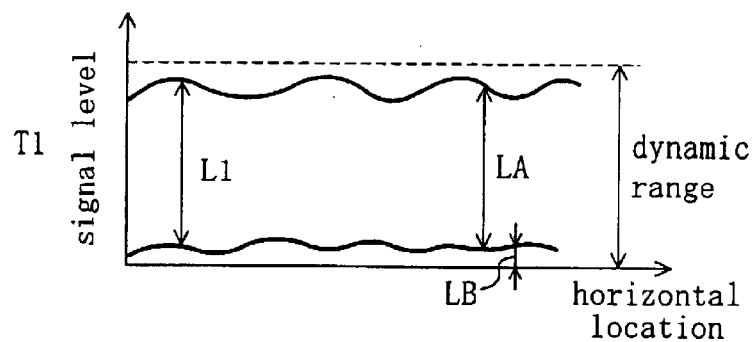
FIGS. 8(a) and 8(b) illustrate the primary technical feature of the second embodiment.
Figure 8B:
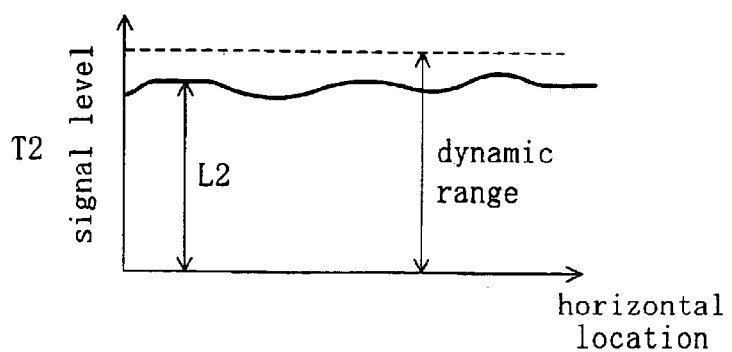

Next, the technical feature of the rangefinder according to the second embodiment will be described with reference to FIGS. 8($a$) and 8($b$). FIG. 8($a$) illustrates the level of the video signal in the first 3D imaging interval T1, while FIG. 8($b$) illustrates the level of the video signal in the second 2D imaging interval T2.

According to this embodiment, the settings of the diaphragm 313 and ND filter 311 are switched between the first and second intervals T1 and T2 to realize highly precise 3D imaging without deteriorating the quality of the 2D image. Specifically, in capturing a 3D image, the signal level LB of the image component representing the object is set much lower than the signal level L2 of the color image component for 2D imaging, thereby setting the signal level LA of the reflected part of the light projected from the light source section 10 sufficiently high.

For example, the exposure controller 301 sets relatively high, or preferably maximizes, the transmittance of the ND filter 311 in the second interval T2. Also, the exposure controller 301 controls the exposure conditions of the camera section 310, e.g., diaphragm stop, sensitivity of the imager or shutter speed, such that the color image component shows a signal level L2, which is high enough but does not reach the saturated level. In this case, the control may be performed in such a manner as to obtain the color image through appropriate exposure. For instance, the average pixel value should be at a predetermined reference level or more, or the peak pixel value should correspond to a maximum luminance value.

In the first interval T1 on the other hand, the exposure controller 301 sets the transmittance of the ND filter 311 relatively low, thereby lowering the signal level LB of the background light, i.e., the image component of the object. And the exposure controller 301 controls the exposure conditions of the camera section 310 such that the range image shows a signal level L1, which is high enough but does not exceed the dynamic range of the imager in the camera section 310. Since the transmittance of the ND filter 311 is set low in this case, the signal level LA of the reflected part of the light projected from the light source section 10, which is essentially equal to the range image component, also decreases. Accordingly, the substantial range image component LA should preferably be increased by setting the optical output power (emission intensity) of the light source section 10 high. As a result, a range image with a high signal-to-noise ratio can be obtained.

Furthermore, a third interval, during which the light is not emitted from the light source section 10, may be provided at the end of the second interval T2. In the third interval T3, the transmittance of the ND filter 311 may be controlled so as to minimize the signal level of the color image component. Even so, if the optical output power of the light source section 10 is set high, then the dynamic range L1 of the range image does not decrease in the first interval T1.

It should be noted that the optical output power of the light source section 10 may be increased or decreased adaptively in addition to controlling the transmittance of the ND filter 311. In this case, the total optical output power is controlled while allowing the intensity of the light to change in a similar pattern to that illustrated in FIG. 24($a$).

Instead of controlling the transmittance of the ND filter 311, the shutter speed of the camera section 310 may be changed (e.g., by using the electronic shuttering function of the CCD) to control the intensity of incoming light as shown in FIG. 4. In such a case, the light source section 10 should project a patterned light beam.

In the foregoing embodiment, the transmittance of the ND filter and the exposure conditions of the camera section are both supposed to be controlled. Alternatively, either the transmittance or the exposure conditions may be controlled.

Also, the first and second intervals T1 and T2 are supposed to alternate in the foregoing embodiment. However, the present invention is in no way limited to such a specific embodiment, but is applicable to even a situation where one of these intervals T1 and T2 lasts continuously. Furthermore, the same sample rate does not have to be applied to both 2D and 3D imaging. For example, the sample rate for 3D imaging may be set longer than that for 2D imaging.

Figure 9:
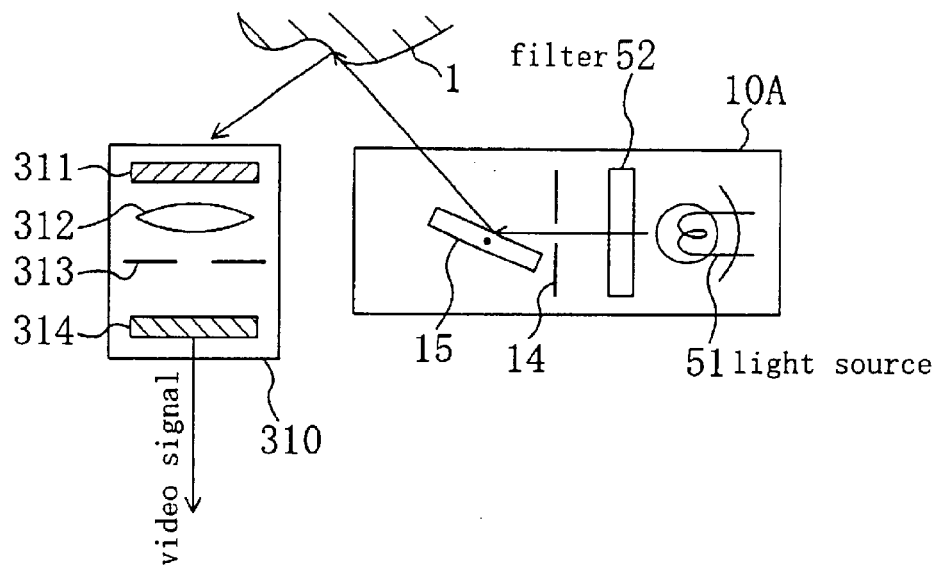
FIG. 9 illustrates another exemplary arrangement of the light source and camera sections in the rangefinder.
Figure 10:
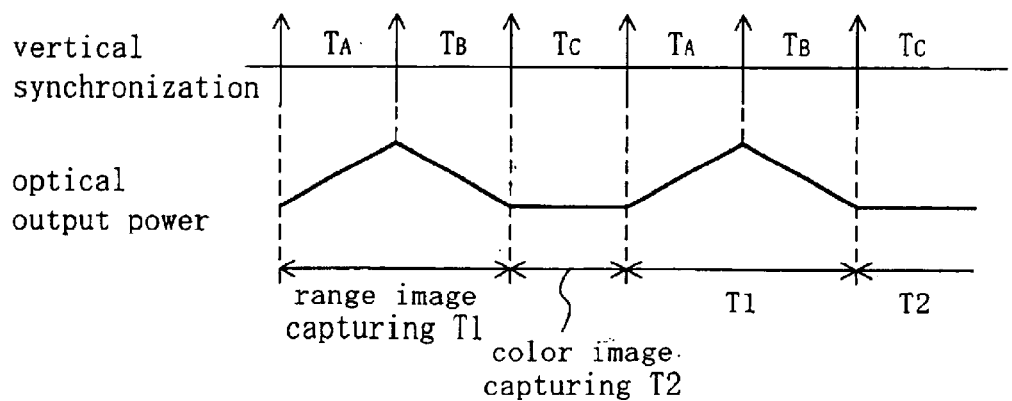
FIG. 10 illustrates how to time the projection of two types of light patterns on a time sharing basis.

FIG. 9 illustrates another exemplary arrangement of the light source and camera sections in the rangefinder according to the second embodiment. As shown in FIG. 9, the light source section 10A may include just one light source 51. In such a case, in the first 3D imaging interval T1, two types of patterned light beams may be projected on a time-sharing basis as shown in FIG. 10.

Embodiment 3

Figure 11:
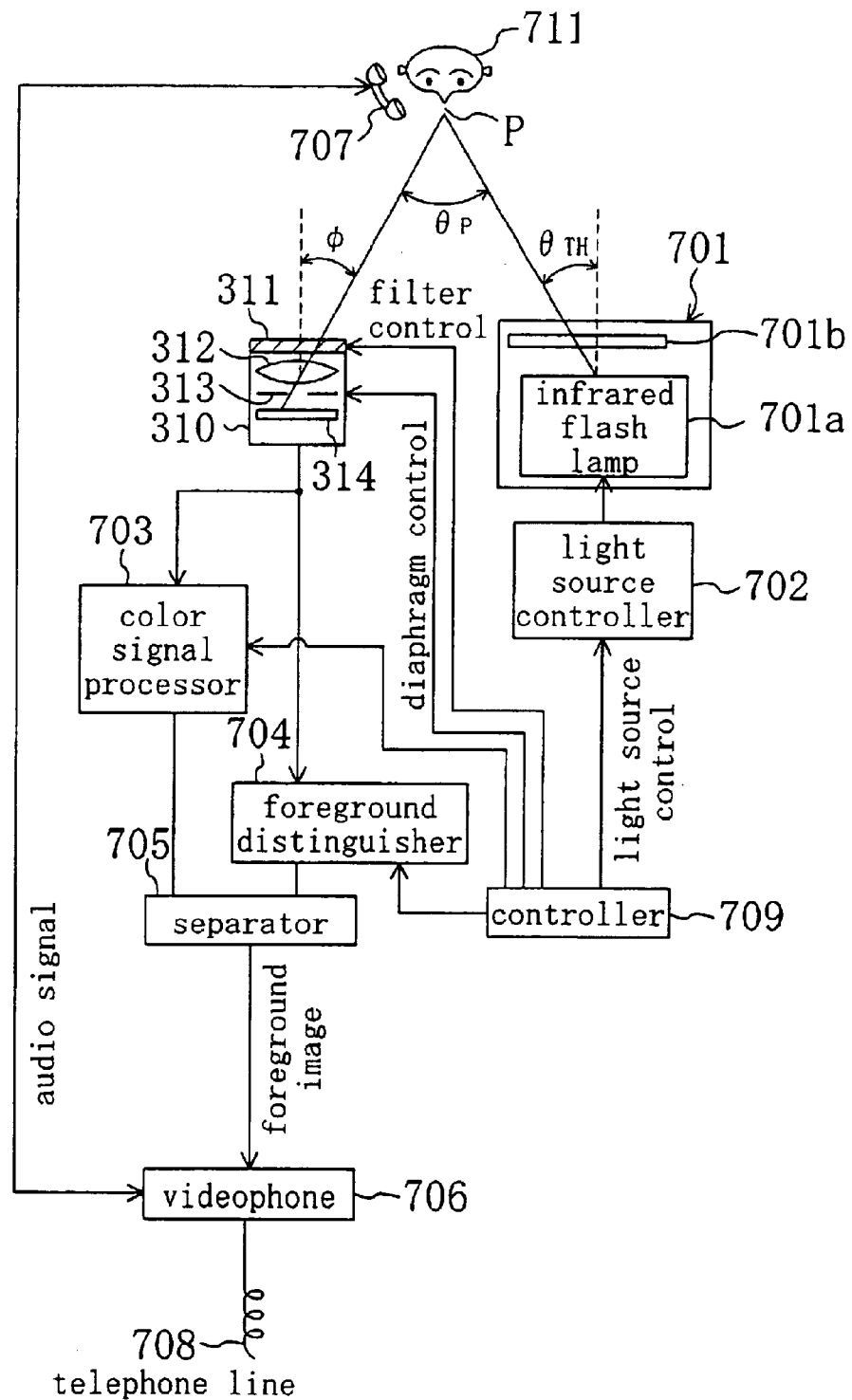
FIG. 11 is a block diagram illustrating a configuration for a videophone system including an imager according to a third embodiment of the present invention.

FIG. 11 illustrates a configuration for a videophone system including an imager according to a third exemplary embodiment of the present invention. In FIG. 11, the same members as those included in the rangefinder shown in FIG. 5 are identified by the same reference numerals and the detailed description thereof will be omitted herein. In this case, an object 711 is a human face.

Figure 12A:
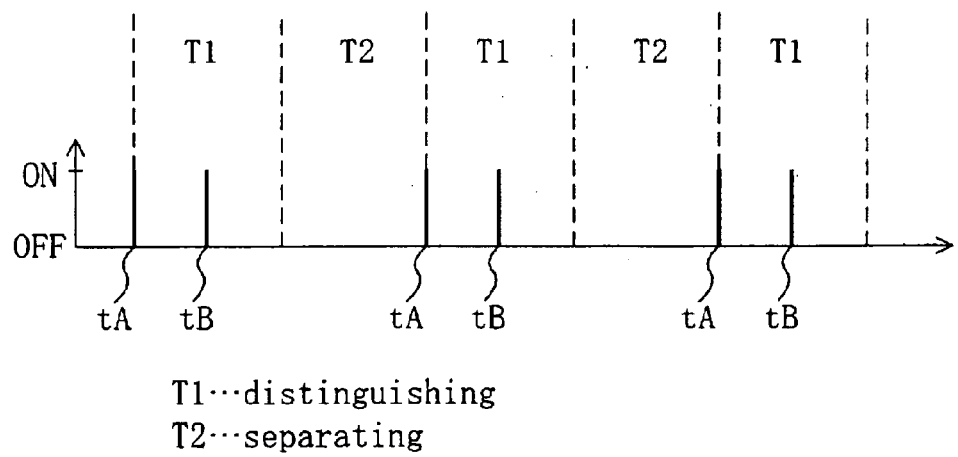
FIG. 12(a) illustrates how the system shown in FIG. 11 operates.
Figure 12B:
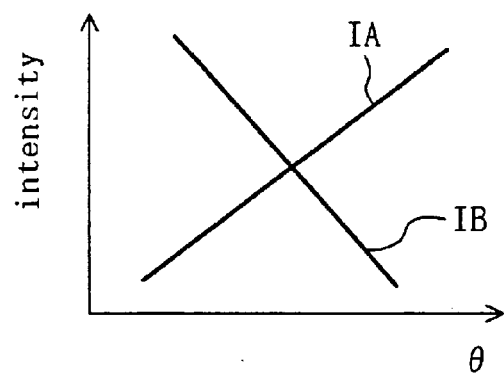
FIG. 12(b) illustrates two types of intensity patterns.

FIG. 12($a$) illustrates how the imager shown in FIG. 11 performs time-sharing processing. As shown in FIG. 12($a$), first and second intervals T1 and T2 alternate according to this embodiment. In the first interval T1, an infrared flash lamp 701$a$ is lit and the image captured is divided into foreground and background parts based on the reflected part of the light. In the second interval T2, a color image (i.e., a 2D image) is captured and only the foreground part is separated from the image.

As shown in FIG. 11, a light source section 701 includes the infrared flash lamp 701$a$ and a transmission liquid crystal display 701$b$. Following an instruction issued from a light source controller 702, the infrared flash lamp 701$a$ is lit twice per first interval T1 (at times tA and tB) to irradiate the object 711 with an infrared ray. The transmission liquid crystal display 701*b* functions as a sort of filter showing a transmittance variable with the spot of the incident and outgoing light beam, and can exhibit two types of distribution patterns of transmittance. These transmittance distribution patterns are switched every time the infrared flash lamp 701*a* is lit responsive to the instruction issued from the light source controller 702. Accordingly, the intensity patterns of the light beams projected onto the object 711 change as shown in FIG. 12(*b*). In FIG. 12(*b*), intensity patterns IA and IB correspond to the times tA and tB, respectively. Both of these intensity patterns IA and IB change depending on the projection angle θ.

A color signal processor 703 processes the color image captured during the second interval T2. A foreground distinguisher 704, which is an exemplary foreground/ background distinguisher as defined in the appended claims, divides the image into foreground and background parts in response to the output signal of the camera section 310. In accordance with the result of division performed by the foreground distinguisher 704, a separator 705 separates a foreground image component from the image output from the color signal processor 703. A videophone 706 sends the foreground image that has been provided from the separator 705 and an audio signal, which has been supplied from a telephone receiver 707, out to a person at the other end of a telephone line 708. A controller 709 controls the ND filter 311, diaphragm 313 and light source controller 702 in the same way as the exposure controller 301 according to the second embodiment. In addition, the controller 709 also controls the color signal processor 703 and foreground distinguisher 704 in terms of the processing timing, for example.

Next, it will be described with reference to FIGS. 13(*a*) through 13(*d*) how the videophone system shown in FIG. 11 operates. Just like FIG. 12(*b*), FIG. 13(*a*) also shows the intensity patterns IA and IB of the light projected on the object 711. FIG. 13(*b*) illustrates a relationship between an intensity ratio IA/IB and a projection angle θ. As can be seen from FIG. 13(*b*), there is one-to-one correspondence between the intensity ratio IA/IB and the projection angle θ. That is to say, if the intensity ratio IA/IB is known, then a corresponding projection angle θ is identifiable immediately.

In the first interval T1, the imager 314 of the camera section 310 twice receives the reflected part of the infrared ray that has been emitted from the infrared flash lamp 701*a*. Responsive to the video signal provided from the imager 314, the foreground distinguisher 704 obtains the intensity ratio IA0/IB0 for each pixel. Then, as shown in FIG. 13(*c*), the foreground distinguisher 704 determines based on the intensity ratio IA0/IB0 whether each pixel belongs to the foreground or background. Specifically, if the intensity ratio IA0/IB0 obtained is found greater than a predetermined reference value $R_{TH}$, then the foreground distinguisher 704 regards the associated pixel as belonging to the foreground (i.e., the human face in this case). Alternatively, if the ratio IA0/IB0 obtained is found smaller than the reference value $R_{TH}$, then the foreground distinguisher 704 regards the associated pixel as belonging to the background. The foreground distinguisher 704 performs such decision for all the pixels, and supplies the results to the separator 705.

Hereinafter, it will be briefly described with reference to FIG. 13(*d*) why such level determination is possible.

In a videophone system such as that illustrated in FIG. 11, the center P of the object 711 in front of the camera section 310 can be predefined at an average location. Thus, a projection angle $θ_{TH}$ corresponding to the center P that has been predefined in this manner can be regarded as reference angle. As can be seen from FIG. 11, if the projection angle is greater than the reference angle $θ_{TH}$, then the object 711 is located closer to this system than the center P is. Alternatively, if the projection angle is smaller than the reference angle $θ_{TH}$, then the object 711 is located more distant from this system than the center P is. There is one-to-one correspondence between the projection angle and the intensity ratio as described above. Thus, by using, as a reference, the intensity ratio $R_{TH}$ associated with the reference angle $θ_{TH}$, the foreground/background division can be performed directly based on the intensity ratio obtained.

Next, in the second interval T2, the camera section 310 captures a color image of the object 711. The color signal processor 703 receives the video signal from the camera section 310, processes the signal in a predetermined manner and then outputs a color video signal to the separator 705. Based on the results of division performed by the foreground distinguisher 704, the separator 705 separates only the foreground part from the color video signal output from the color signal processor 703, and then passes the foreground part separated to the videophone 706. The videophone 706 outputs the foreground image and the audio signal, which has been supplied from the telephone receiver 707, over the telephone line 708.

Figure 14A:
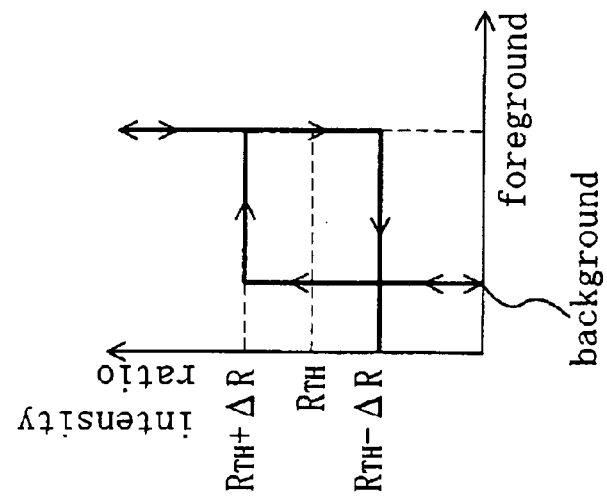
FIGS. 14(a) and 14(b) illustrate a situation where the foreground/background division criterion shows hysteresis.
Figure 14B:
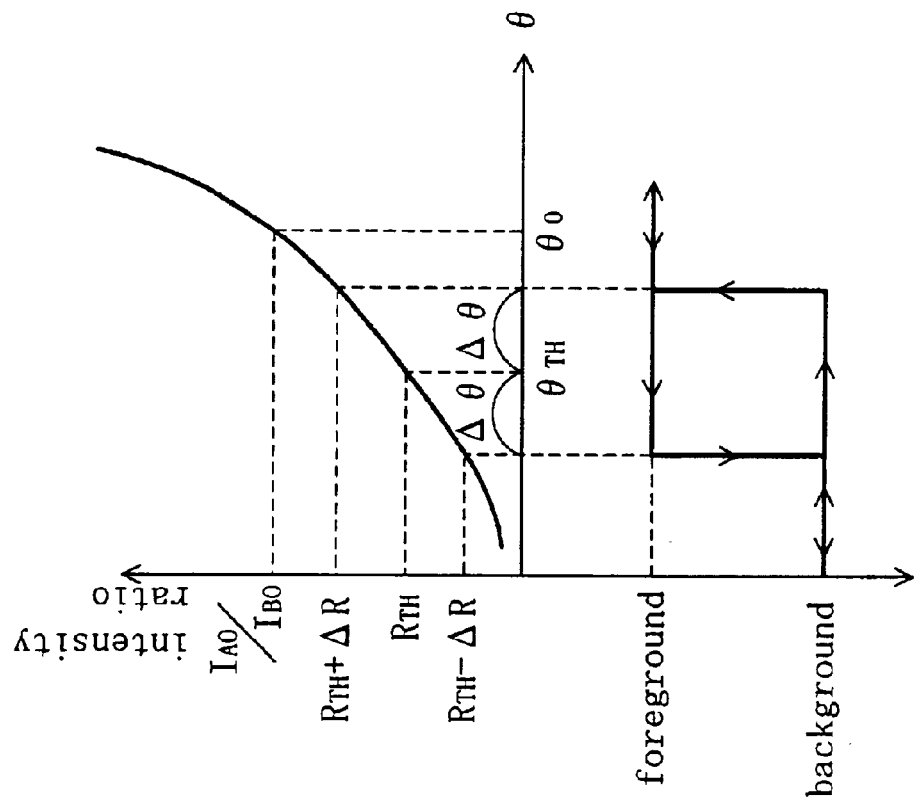

It should be noted that the reference value $R_{TH}$ may be represented by a hysteresis loop as shown in FIGS. 14(*a*) and 14(*b*). Then, the foreground/background division can be performed even more precisely even if noise is superimposed.

Figure 15B:
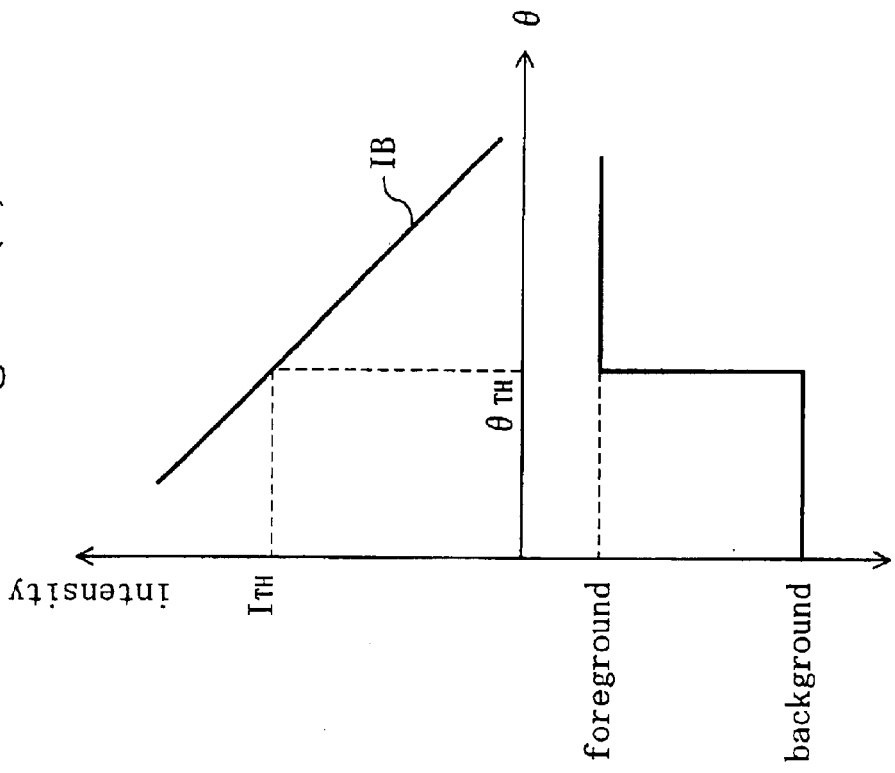
FIGS. 15(a) and 15(b) illustrate how to distinguish the foreground and background parts from each other based on the intensity itself.

In the foregoing embodiment, the foreground/background division is carried out based on an intensity ratio obtained. Alternatively, the division may be performed based on the emission intensity itself. In such a case, the foreground/ background division can be performed directly based on the intensity IB, i.e., the intensity of the light beam that was projected at the time t2 (or t1) and then received at the imager 314, with respect to a predefined reference intensity $I_{TH}$ as shown in FIG. 15(*a*). This is because there is also one-to-one correspondence between the projection angle θ and the emission intensity as shown in FIG. 15(*b*). However, unlike the case of using the intensity ratio, the emission intensity itself differs depending on the color of the object 711 at the surface. Accordingly, to perform the foreground/ background division as precisely as the case of using the intensity ratio, the reference intensity $I_{TH}$ should be changed depending on the surface color of the object 711.

Figure 24A:
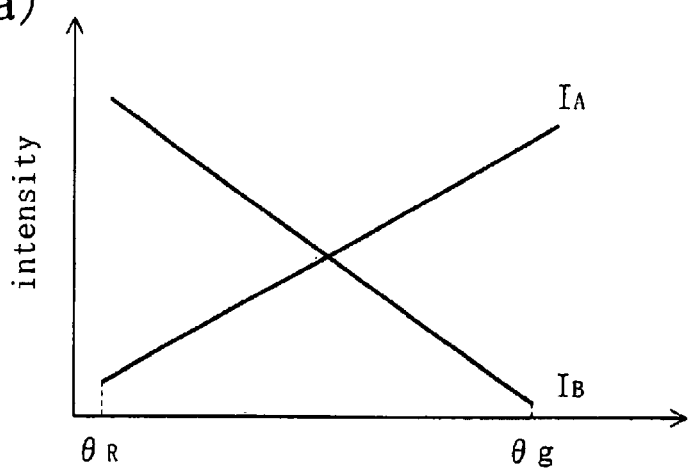
FIG. 24(a) is a graph illustrating a relationship between the intensities of light beams emitted and the projection angle of a combined light beam.
Figure 24B:
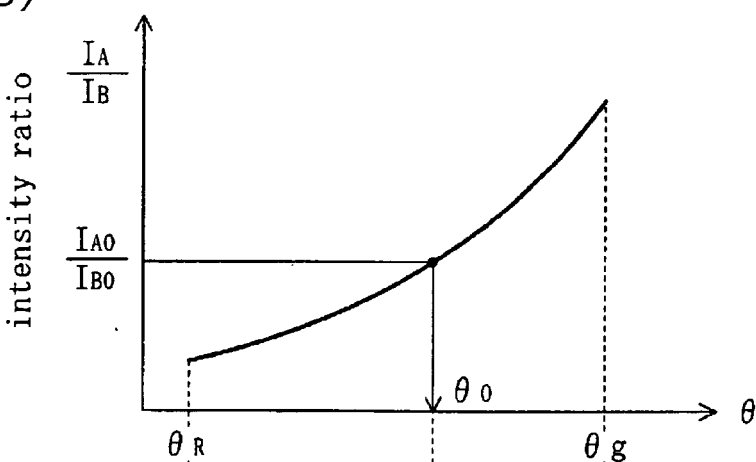
FIG. 24(b) is a graph illustrating a relationship between the intensity ratio of the light beams emitted and the projection angle of the combined light beam.
Figure 24C:
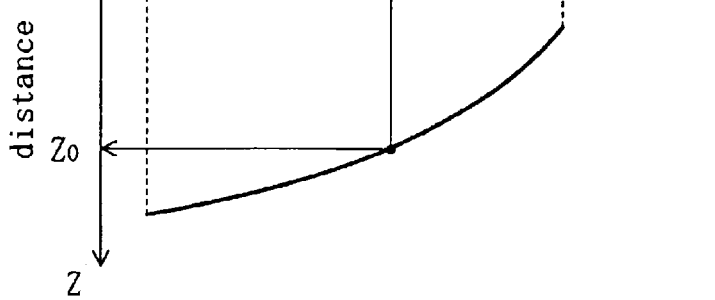
FIG. 24(c) is a graph illustrating a relationship between the projection angle and the distance to the object.
Figure 25:
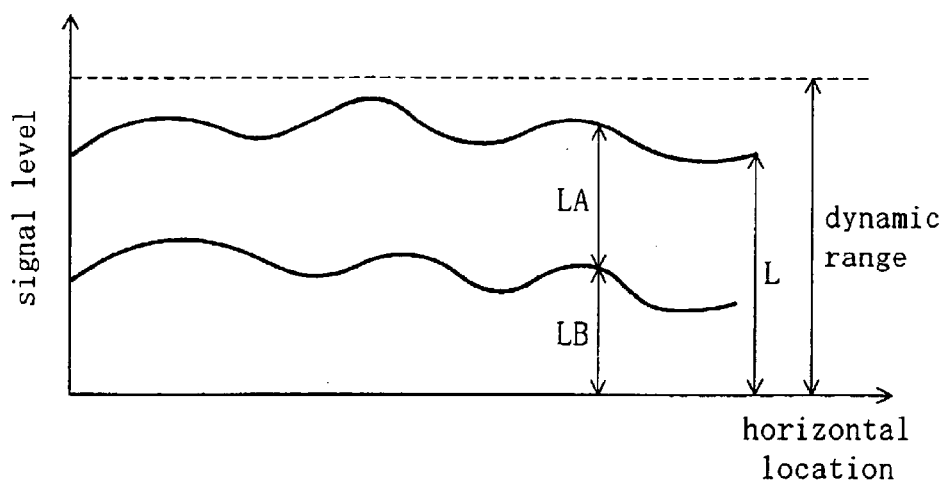
FIG. 25 illustrates the level of a video signal where the prior art rangefinder captures a 3D image.

In the foregoing embodiment, the infrared flash lamp 701*a* is adopted as an exemplary light source. Alternatively, a lamp of the type emitting light continuously may also be used. In such a case, the camera section 10 should be provided with an imager for capturing only visible light and another imager for capturing only the infrared radiation. Also, as shown in FIG. 24, the object may be swept with the projected radiation by modulating the emission intensity with time.

It is naturally possible to separate the background part, in place of the foreground one, from the image in a similar manner.

Modified Example 1

Figure 16:
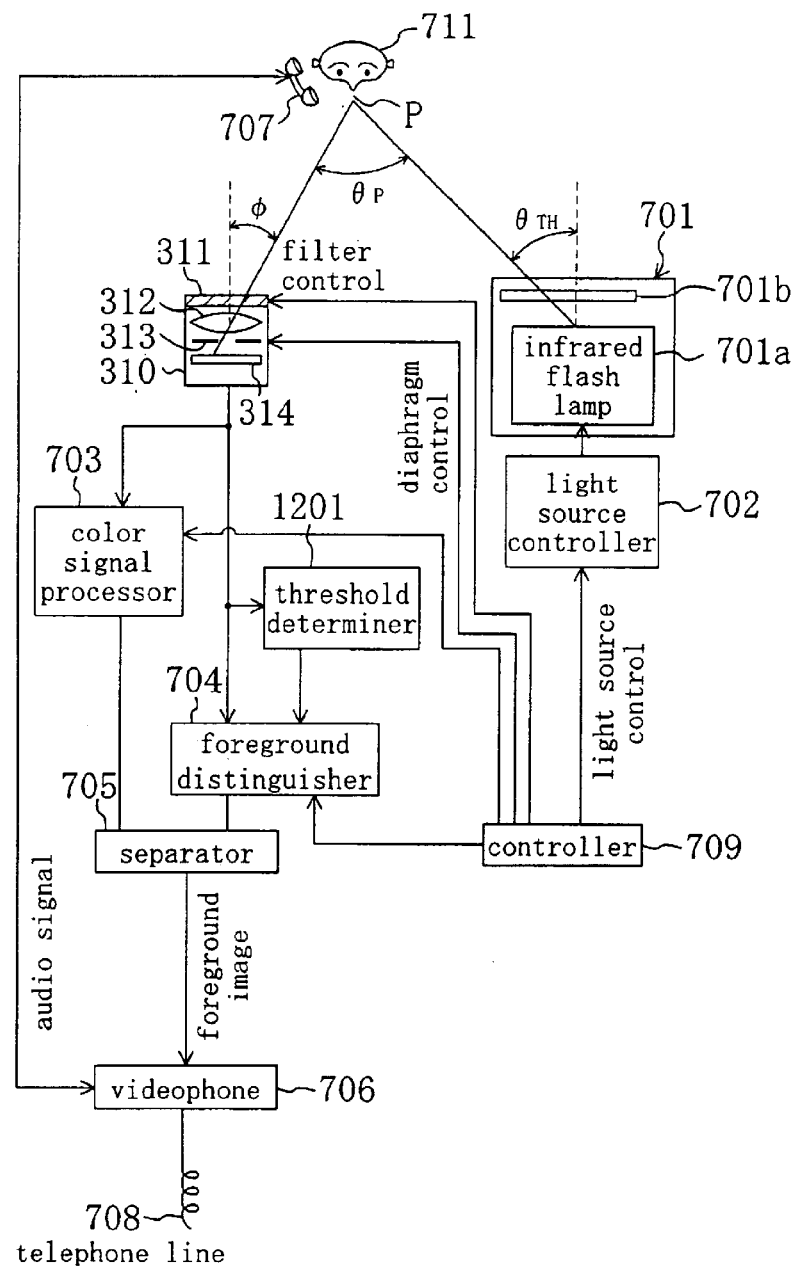
FIG. 16 is a block diagram illustrating a configuration for a videophone system including an imager with a threshold determiner according to a first modified example of the third embodiment.

FIG. 16 illustrates an exemplary configuration for a videophone system according to a first modified example of the third embodiment. In FIG. 16, the same members as those illustrated in FIG. 11 are identified by the same reference numerals. The system shown in FIG. 16 is different from the counterpart shown in FIG. 11 in that the system shown in FIG. 16 additionally includes a threshold determiner 1201 for determining a threshold value as a reference of foreground/background division for each individual object. Based on the distribution of intensities of reflected light beams associated respective pixels, the threshold determiner 1201 determines the threshold value. More specifically, the threshold determiner 1201 determines the threshold value by mode method, P-tile method or Ohtsu's criterion decision method in response to the output signal of the camera section 310.

Figure 17A:
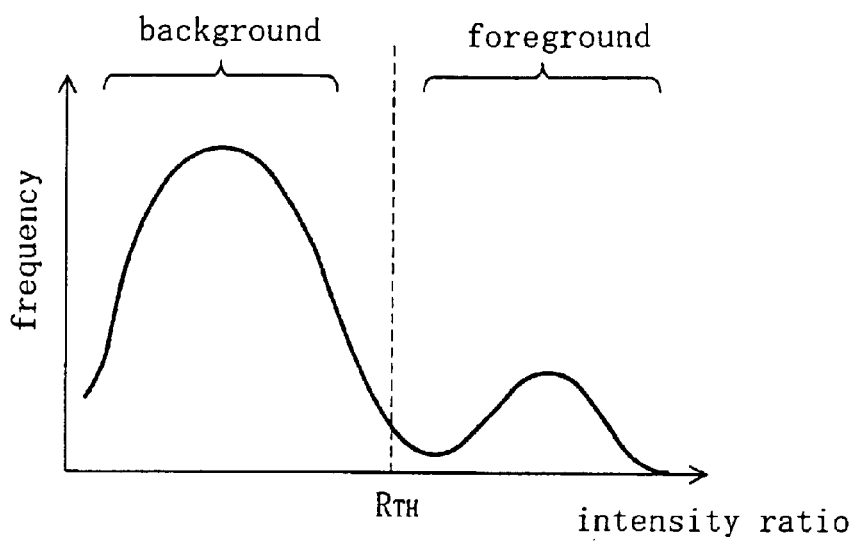
FIG. 17(a) illustrates how to determine a threshold value by a mode method.

FIG. 17(a) illustrates how to determine the threshold value by the mode method. According to the mode method, the distribution of intensities of reflected light beams associated with respective pixels is represented as a histogram and a value at the bottom of the histogram is regarded as the threshold value. Suppose the histogram shown in FIG. 17(a) is obtained based on the luminance ratios of respective pixels that are output from the imager 314 (i.e., the intensity ratio shown in FIG. 13(b)). The threshold determiner 1201 identifies the bottom of the histogram and determines the intensity ratio $R_{TH}$ at the bottom as the threshold value. Accordingly, a different threshold value is obtained for each individual object, thus realizing even more precise foreground/background division. The threshold value that has been determined by the threshold determiner 1201 is provided to the foreground distinguisher 704.

Figure 15A:
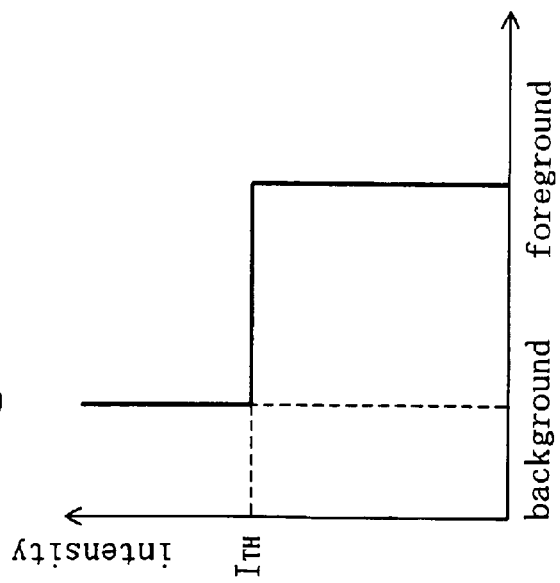

Alternatively, the distribution of emission intensities themselves may also be used instead of the intensity ratio. In such a case, the reference intensity $I_{TH}$ shown in FIG. 15(a) is determined. As described above, if the intensity itself is used as a reference of foreground/background division, then the result of such a division is much more likely to be affected by the color of the object 711. Thus, the threshold determiner 1201 can greatly contribute to the improvement of division precision.

Figure 17B:
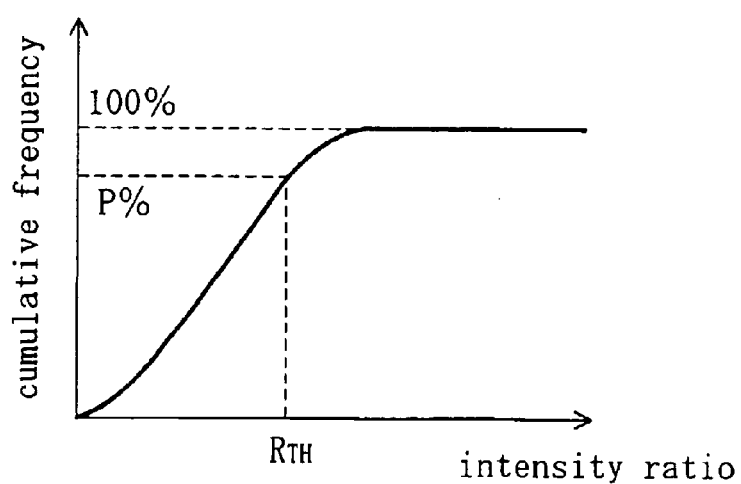
FIG. 17(b) illustrates how to determine a threshold value by a P-tile method.

FIG. 17(b) illustrates how to determine the threshold value by the P-tile method. According to the P-tile method, when a cumulative value reaches a predetermined value in a cumulative histogram, the predetermined value is regarded as the threshold value. Suppose the cumulative histogram shown in FIG. 17(b) is obtained based on the intensity ratios of respective pixels that are output from the imager 314. The threshold determiner 1201 regards an intensity ratio $R_{TH}$, which is associated with a cumulative frequency of P %, as the threshold value. In a videophone system, the foreground part (i.e., a human face) would normally account for a substantially constant percentage of the whole picture captured by the camera. Accordingly, the P value of the cumulative frequency may be predefined as well.

According to the Ohtsu's method, the threshold value is determined so as to maximize an inter-class variance between two separate regions around the threshold value. The total area of the image captured by the camera is divided into two regions R1 and R2. The inter-class variance $\sigma_B^2(t)$ is given by the following Equation (2):

$$\sigma_B^2(t) = \omega_1(\mu_1-\mu_T)^2 + \omega_2(\mu_2-\mu_T)^2 = \omega_1 \cdot \omega_2(\mu_1-\mu_2)^2 \quad (2)$$

where $\omega_1$ and $\omega_2$ are ratios of the regions R1 and R2 to the entire area (i.e., $\omega_1+\omega_2=1$), $\mu_T$ is an average brightness value over the entire area, $\sigma_T^2$ is variance and $\mu_1$ and $\mu_2$ are average brightness values of the regions R1 and R2, respectively.

The decision criterion $\eta(t)$ is given by the following Equation (3):

$$\eta(t) = \sigma_B^2(t)/\sigma_T^2 \quad (3)$$

A value of t associated with the maximum value of $\eta(t)$ is obtained as the threshold value.

The foregoing three methods are adopted just as illustrative digitizing techniques. Thus, it is naturally possible to obtain the threshold value by any other digitizing technique.

Modified Example 2

Figure 18:
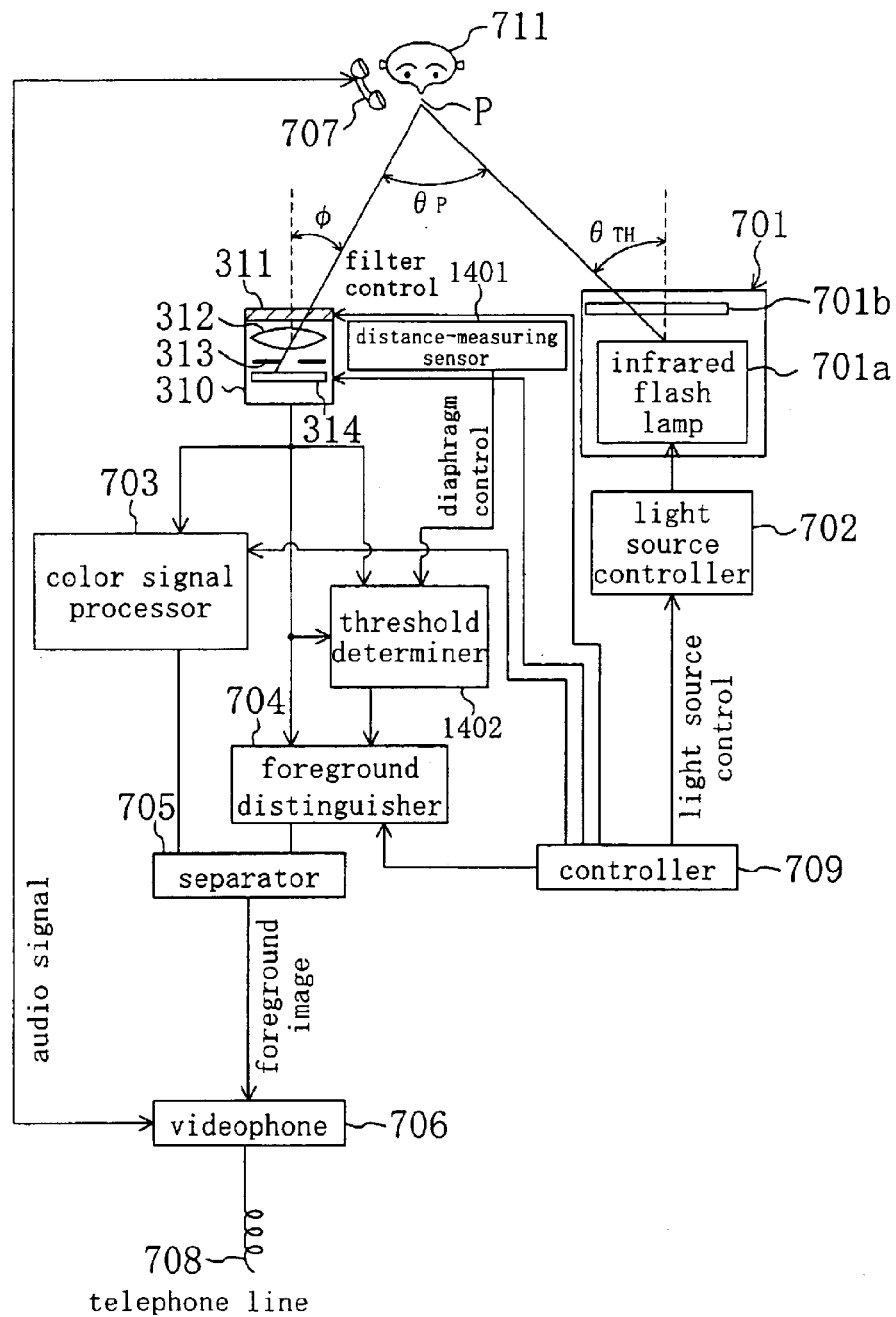
FIG. 18 is a block diagram illustrating a configuration for a videophone system including an imager with a distance-measuring sensor and a threshold determiner according to a second modified example of the third embodiment.

FIG. 18 illustrates an exemplary configuration for a videophone system according to a second modified example of the third embodiment. As in FIG. 16, the same members as those illustrated in FIG. 11 are identified by the same reference numerals in FIG. 18. The system shown in FIG. 18 is different from the counterpart shown in FIG. 11 in that the system shown in FIG. 18 additionally includes a distance-measuring sensor 1401 such as ultrasonic sensor. A threshold determiner 1402 determines a threshold value for each individual object 711 based on not only the signal output from the imager 314 but also on the range information provided from the distance-measuring sensor 1401.

Specifically, the threshold determiner 1402 obtains a surface reflectance R of the object 711 based on the output signal of the imager 314 and the distance to the object 711 that has been measured by the distance-measuring sensor 1401. Then, based on the surface reflectance R, the threshold determiner 1402 determines the threshold value as a reference of foreground/background division.

Hereinafter, it will be described in more detail how to determine the threshold value.

The distance-measuring sensor 1401 detects an approximate distance r to the object 711 and outputs the value r to the threshold determiner 1402. Based on the approximate distance value r and the intensity IB (or IA), which is the output of the imager 314, the threshold determiner 1402 estimates the surface reflectance R of the object 711 for each pixel by the following Equation (4):

$$R = I_B \cdot r^2 / (K \cdot A) \quad (4)$$

where K is the brightness of the light source and A is the sensitivity of the imager 314.

And based on the surface reflectance R obtained, the threshold determiner 1402 determines the threshold value of the intensity IB, i.e., the reference intensity $I_{TH}$ shown in FIG. 15. First, the threshold determiner 1402 determines a threshold value $IW_{TH}$ associated with a white foreground (i.e., the surface of the object 711). This threshold value $IW_{TH}$ is determined to obtain an optimum separate image by getting the threshold value adjusted by an operator while watching a monitor screen (not shown). This threshold value is determined either as an initialization step when this system is designed or fabricated or as a calibration needed before this system is operated for the first time.

By modifying Equation (4) and using the white surface reflectance $R_W$ as a reference, the reference intensity $IW_{TH}$ associated with the white foreground is given by the following Equation (5):

$$IW_{TH} = R_W \cdot S \quad (5)$$

where $S = K \cdot A / r^2$.

Accordingly, the reference intensity $I_{TH}$ for an arbitrary surface reflectance R of the foreground is given by the following Equation (6) using the predetermined reference intensity $IW_{TH}$ and the white surface reflectance $R_W$:

$$I_{TH} = IW_{TH}(R/R_W) \quad (6)$$

In this manner, the surface reflectance R can be obtained by Equation (4) and the reference intensity $I_{TH}$ can be obtained by Equation (6) for each individual object 711.

When the intensity itself is used as a reference of foreground/background division, the result of such a division is much more likely to be affected by the color of the object 711 as described above. Thus, the threshold determiner 1402 can greatly contribute to the improvement of division precision.

In the foregoing embodiment, the distance-measuring sensor 1401 is provided as exemplary means for providing range information to the threshold determiner 1402. Alternatively, the range calculator 30 shown in FIG. 5 may be provided instead of the distance-measuring sensor 1401. In such a case, the range calculator 30 may obtain an average distance to the object 711 around at its center and output the average as the approximate distance r to the threshold determiner 1402.

Figure 19:
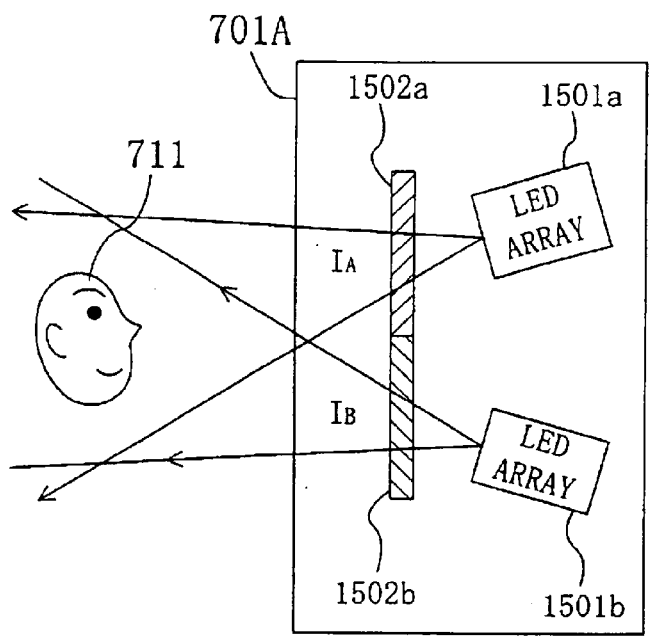
FIG. 19 illustrates another exemplary arrangement of the light source section.

FIG. 19 illustrates another exemplary arrangement for the light source section 701. In the example illustrated in FIG. 19, two infrared LED arrays 1501*a* and 1501*b* are vertically disposed such that the projected light beams thereof are directed toward the object 711. And two filters 1502*a* and 1502*b* with adjustable transmittance are placed in front of the LED arrays 1501*a* and 1501*b*, respectively. The transmittance values of the filters 1502*a* and 1502*b* are adjusted such that the intensities IA and IB of the light beams that have passed through these filters 1502*a* and 1502*b* change depending on the location as shown in FIG. 13(*a*).

Figure 20:
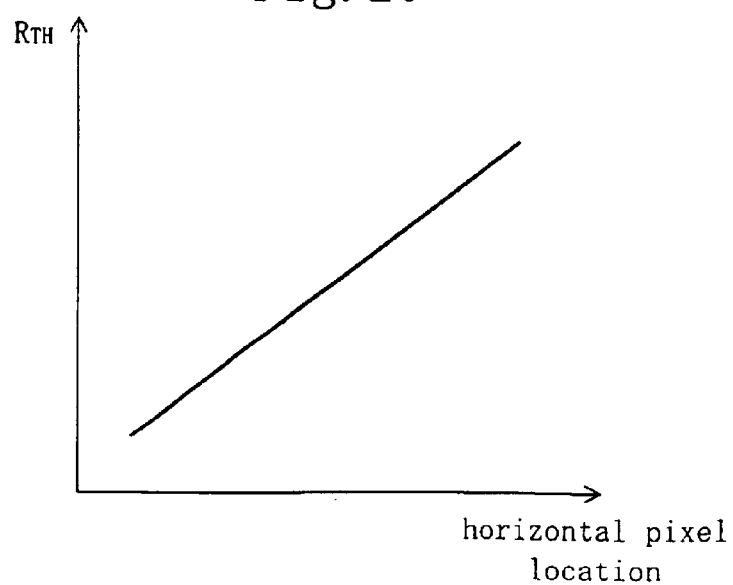
FIG. 20 illustrates an exemplary technique of changing a threshold value depending on a pixel location.

Also, the threshold value used as a reference of foreground/background division may be changed depending on the pixel location in the imager as shown in FIG. 20. In this manner, the displacement of the object as viewed from each pixel in the imager can be corrected. As a result, the foreground/background division can be performed even more precisely.

Figure 21:
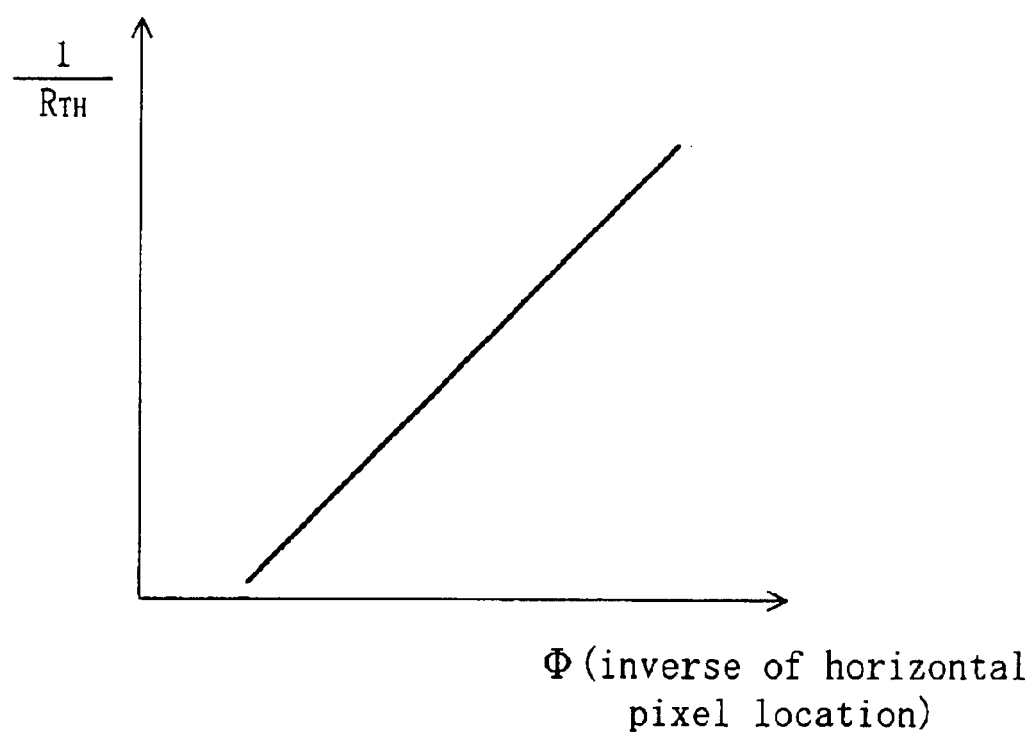
FIG. 21 illustrates another exemplary technique of changing a threshold value depending on a pixel location.
Figure 23A:
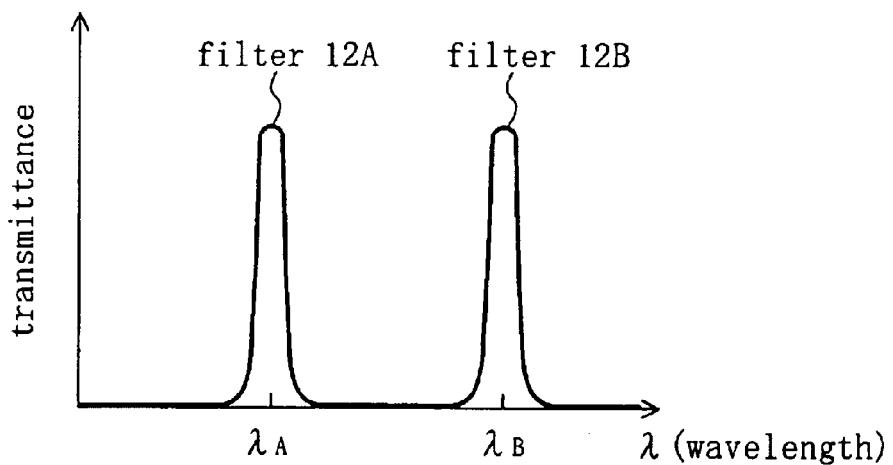
FIGS. 23(a) and 23(b) illustrate the optical characteristics of filters included in the rangefinder shown in FIG. 22.
Figure 23B:
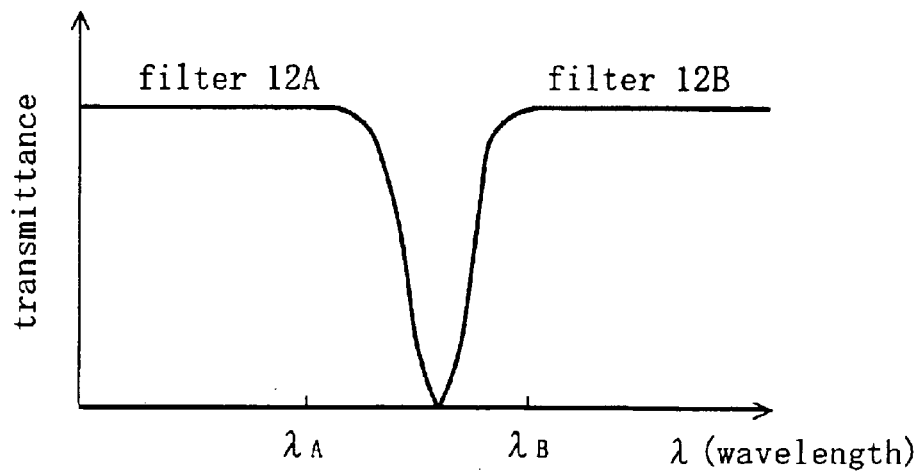

Furthermore, the threshold value $R_{TH}$ may be determined as shown in FIG. 21 such that a relationship between an inverse $1/R_{TH}$ of the threshold value $R_{TH}$ and $1/\Phi$, which is an inverse of the horizontal pixel location, is given by the following Equation (7):

$$1/R_{TH} = k1 \cdot \Phi + k2 \quad (7)$$

where k1 and k2 are predetermined constants.

This equation approximates a threshold value $R_{TH}$ that has been determined depending on the depth of the object 711 when the viewing angles ø and θ of the camera section 310 and the light source section 710 at the object 711 are small as shown in FIG. 11. Alternatively, an inverse of the angle ø may be used as $\Phi$. The foregoing Equation (7) uses a linear function. Instead, any other monotonically changing function may be used.

What is claimed is:

1. A rangefinder for obtaining information about the three-dimensional location of an object by projecting light onto the object and receiving part of the light that has been reflected from the object, the rangefinder comprising:
   a light source for projecting the light on the object;
   a shutter positioned between the light source and the object which can open and close freely and blocks the light that has been projected from the light source when closed;
   a camera for receiving the part of the projected light that has been reflected from the object;
   a distance-measuring sensor for measuring the distance to the object; and
   a controller for controlling optical output power of the light source and/or exposure conditions of the camera based on range information about the object,
   wherein the controller uses the output of the distance-measuring sensor as an item of the range information about the object, and
   wherein the controller selectively controls the open and closed states of the shutter to at least prevent damage to the object when the object is positioned close to the light source.

2. The rangefinder of claim 1, wherein the distance-measuring sensor utilizes reflected ultrasonic waves from the object to measure distance.

3. The rangefinder of claim 1, further comprising a range calculator for obtaining a range image based a video signal output from the camera,
   wherein the controller uses the range image obtained by the range calculator as an item of the range information about the object.

4. The rangefinder of claim 1, wherein if the controller has determined based on the range information that the distance to the object is equal to or greater than a first threshold value, the controller increases the optical output power of the light source, and
   wherein if the controller has determined based on the range information that the distance is equal to or smaller than a second threshold value, the controller decreases the optical output power of the light source.

5. The rangefinder of claim 1, wherein the exposure conditions of the camera are defined based on at least one of a diaphragm stop, a sensitivity of an imager and a shutter speed.

6. A rangefinder for obtaining information about the three-dimensional location of an object by projecting light onto the object and receiving part of the light that has been reflected from the object, the rangefinder comprising:
   a light source for projecting the light on the object;
   a shutter positioned between the light source and the object which can open and close freely and blocks the light that has been projected from the light source when closed;
   a camera for receiving the part of the projected light that has been reflected from the object; and
   a controller for controlling optical output power of the light source and/or exposure conditions of the camera based on information about the level of a video signal output from the camera,
   wherein the controller selectively controls the open and closed states of the shutter to at least prevent damage to the object when the object is positioned close to the light source.

7. The rangefinder of claim 6, wherein if the controller has determined based on the level information that the distance to the object is equal to or greater than a first threshold value, the controller increases the optical output power of the light source, and
   wherein if the controller has determined based on the level information that the distance is equal to or smaller than a second threshold value, the controller decreases the optical output power of the light source.

8. The rangefinder of claim 6, wherein the exposure conditions of the camera are defined based on at least one of a diaphragm stop, a sensitivity of an imager and a shutter speed.

9. The rangefinder of claim 6 further comprising a distance-measuring sensor for measuring a distance to the object,
   wherein the controller uses the output of the distance-measuring sensor as an item of the range information about the object.

10. A rangefinder for obtaining information about the three-dimensional location of an object by projecting light onto the object and receiving part of the light that has been reflected from the object, the rangefinder comprising:

a light source for projecting the light on the object;

a camera for receiving the part of the projected light that has been reflected from the object; and a controller for controlling optical output power of the light source and exposure conditions of the camera, wherein the controller sets the exposure conditions, in a first interval during which a range image is captured, such that an intensity of incoming light is relatively low and the optical output efficiently high that the range image can be captured with the exposure conditions, and wherein the controller sets, in a second interval during which a color image is captured, the exposure conditions such that the intensity of incoming light is relatively high and the output power is off.

* * * * *

UNITED STATES PATENT AND TRADEMARK OFFICE
CERTIFICATE OF CORRECTION

PATENT NO. : 6,876,392 B1
DATED : April 5, 2005
INVENTOR(S) : Kenya Uomori et al.

It is certified that error appears in the above-identified patent and that said Letters Patent is hereby corrected as shown below:

Column 18,
Line 62, "claim 6 further" should read -- claim 6, further --.

Signed and Sealed this

Twenty-seventh Day of September, 2005

JON W. DUDAS
*Director of the United States Patent and Trademark Office*